(12) United States Patent
Wouhaybi et al.

(10) Patent No.: US 10,453,114 B2
(45) Date of Patent: Oct. 22, 2019

(54) SELECTIVE SHARING OF USER INFORMATION BASED ON CONTEXTUAL RELATIONSHIP INFORMATION, SUCH AS TO CROWD-SOURCE GIFTS OF INTEREST TO A RECIPIENT

(71) Applicant: Intel Corporation, Santa Clara, CA (US)

(72) Inventors: Rita H Wouhaybi, Portland, OR (US); Timothy G Coppernoll, Portland, OR (US); Jose K Sia, Jr., Portland, OR (US); Richard T Beckwith, Hillsboro, OR (US); Maria Bezaitis, Portland, OR (US); Scott H Robinson, Portland, OR (US); Vinay Phegade, Beaverton, OR (US); Michael Lemay, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1039 days.

(21) Appl. No.: 14/780,535

(22) PCT Filed: Jun. 23, 2014

(86) PCT No.: PCT/US2014/043698
§ 371 (c)(1),
(2) Date: Sep. 26, 2015

(87) PCT Pub. No.: WO2014/209900
PCT Pub. Date: Dec. 31, 2014

(65) Prior Publication Data
US 2016/0055571 A1 Feb. 25, 2016

Related U.S. Application Data

(60) Provisional application No. 61/838,339, filed on Jun. 23, 2013.

(51) Int. Cl.
*G06Q 30/00* (2012.01)
*G06Q 30/06* (2012.01)
(Continued)

(52) U.S. Cl.
CPC ....... *G06Q 30/0635* (2013.01); *G06F 16/285* (2019.01); *G06F 16/9535* (2019.01);
(Continued)

(58) Field of Classification Search
CPC .......... G06Q 30/0635; G06Q 30/0601; G06Q 30/0631; G06Q 30/0641; G06Q 30/0214;
(Continued)

(56) References Cited

U.S. PATENT DOCUMENTS

| 5,481,312 A | 1/1996 | Cash et al. |
| 6,081,774 A | 6/2000 | de Hita et al. |

(Continued)

FOREIGN PATENT DOCUMENTS

| JP | 2002007752 A | 1/2002 |
| JP | 2005509964 A | 4/2005 |

(Continued)

OTHER PUBLICATIONS

Office Action dated Oct. 20, 2016 from Korean Patent Application No. 2015-7033278, 8 pages.
(Continued)

*Primary Examiner* — Yogesh C Garg
(74) *Attorney, Agent, or Firm* — Schwabe, Williamson & Wyatt, P.C.

(57) ABSTRACT

Selective/controlled disclosure of user information to private workspaces of other users/invitees based on context/contextual relations, and a shared workspace or market to collaborate amongst the other users (e.g., to crowd-source gifts of interest to the recipient). Contextual disclosure may be based on common context or commonality under a set of
(Continued)

conditions, such as a topic, which may include known topics of relationships amongst the users and/or undiscovered contexts. As an example, items of interest to each user are identified and clustered, keywords are assigned to the clusters indicative of topics/subjects of interests to the respective users, recipient keywords are compared to keywords of an invitee to identify common keywords as shared interests, and items of interest to the recipient that relate to the common keywords are disclosed to the invitee as a personalized wish-list. Keyword weighting and/or keyword/item level privacy designations may be provided to further control disclosure.

20 Claims, 15 Drawing Sheets

(51) Int. Cl.
  *G06F 16/28* (2019.01)
  *G06F 16/9535* (2019.01)
  *G07C 13/00* (2006.01)
  *G06Q 30/02* (2012.01)

(52) U.S. Cl.
  CPC ......... *G06Q 30/0641* (2013.01); *G07C 13/00* (2013.01); *G06Q 30/02* (2013.01); *G06Q 30/0613* (2013.01)

(58) Field of Classification Search
  CPC  G06Q 30/0613; G06Q 30/02; G06F 16/9535; G06F 16/285; G07C 13/00
  USPC ................ 705/26.1, 26.81, 26.7, 27.1, 26.41
  See application file for complete search history.

(56) References Cited

U.S. PATENT DOCUMENTS

| | | | |
|---|---|---|---|
| 6,151,598 A | 11/2000 | Shaw et al. | |
| 6,167,445 A | 12/2000 | Gai et al. | |
| 6,502,131 B1 | 12/2002 | Vaid et al. | |
| 6,564,222 B1 | 5/2003 | Sassano | |
| 6,594,654 B1 | 7/2003 | Salam et al. | |
| 6,633,315 B1 | 10/2003 | Sobeski et al. | |
| 6,633,868 B1 | 10/2003 | Min et al. | |
| 6,665,746 B1 | 12/2003 | Liong | |
| 6,668,251 B1 | 12/2003 | Goldberg | |
| 6,697,842 B1 | 2/2004 | Smith et al. | |
| 6,721,748 B1 | 4/2004 | Knight et al. | |
| 6,748,195 B1 | 6/2004 | Phillips | |
| 6,798,867 B1 | 9/2004 | Zirngibl et al. | |
| 6,950,988 B1 | 9/2005 | Hawkins et al. | |
| 6,959,294 B2 | 10/2005 | Sullivan et al. | |
| 7,043,719 B2 | 5/2006 | Gotwals et al. | |
| 7,076,540 B2 | 7/2006 | Kurose et al. | |
| 7,756,753 B1 | 7/2010 | McFarland | |
| 7,933,810 B2 * | 4/2011 | Morgenstern | G06Q 30/02 705/26.1 |
| 8,411,113 B1 | 4/2013 | Cornell et al. | |
| 8,812,828 B2 | 8/2014 | Datta et al. | |
| 8,837,733 B2 | 9/2014 | Alpert et al. | |
| 9,124,635 B2 | 9/2015 | Robinson et al. | |
| 9,886,171 B2 * | 2/2018 | Lee | G06F 3/0485 |
| 2002/0143759 A1 | 10/2002 | Yu | |
| 2002/0143914 A1 | 10/2002 | Cihula | |
| 2003/0028390 A1 | 2/2003 | Stern et al. | |
| 2003/0063087 A1 | 4/2003 | Doyle et al. | |
| 2003/0140088 A1 | 7/2003 | Robinson et al. | |
| 2005/0060365 A1 | 3/2005 | Robinson et al. | |
| 2006/0282671 A1 | 12/2006 | Burton | |
| 2008/0065580 A1 * | 3/2008 | Spence | G06Q 10/087 706/62 |
| 2008/0182592 A1 | 7/2008 | Cha et al. | |
| 2009/0257589 A1 | 10/2009 | Yokota et al. | |
| 2010/0034457 A1 | 2/2010 | Berliner et al. | |
| 2011/0065419 A1 | 3/2011 | Book et al. | |
| 2011/0131120 A1 | 6/2011 | Sciuk | |
| 2011/0145916 A1 | 6/2011 | Mckenzie et al. | |
| 2011/0158470 A1 | 6/2011 | Martin et al. | |
| 2011/0209194 A1 | 8/2011 | Kennedy | |
| 2011/0225626 A1 | 9/2011 | Covington et al. | |
| 2011/0307294 A1 | 12/2011 | Barkai et al. | |
| 2011/0320823 A1 | 12/2011 | Saroiu et al. | |
| 2012/0004954 A1 | 1/2012 | Eisinger et al. | |
| 2012/0030110 A1 | 2/2012 | Prakash et al. | |
| 2012/0222083 A1 | 8/2012 | Vaha-Sipila et al. | |
| 2012/0226687 A1 | 9/2012 | de Lara | |
| 2012/0291022 A1 | 11/2012 | Mehta et al. | |
| 2012/0317555 A1 | 12/2012 | Aluru et al. | |
| 2013/0024325 A1 | 1/2013 | Sanguinetti et al. | |
| 2013/0101175 A1 | 4/2013 | Lynch | |
| 2013/0159704 A1 | 6/2013 | Chandrasekaran et al. | |
| 2013/0167078 A1 * | 6/2013 | Monnig | G06F 3/0484 715/800 |
| 2013/0174211 A1 | 7/2013 | Aad et al. | |
| 2013/0243189 A1 | 9/2013 | Ekberg et al. | |
| 2013/0286162 A1 | 10/2013 | Lee et al. | |
| 2014/0040059 A1 * | 2/2014 | Barabas | G06Q 30/0601 705/26.1 |
| 2014/0096182 A1 | 4/2014 | Smith | |
| 2014/0137178 A1 | 5/2014 | Thom et al. | |

FOREIGN PATENT DOCUMENTS

| | | |
|---|---|---|
| JP | 2010518481 A | 5/2010 |
| JP | 2010128771 A | 6/2010 |
| JP | 2013-073524 A | 4/2013 |
| JP | 6152475 B2 | 6/2017 |
| KR | 10-2007-0037665 A | 4/2007 |
| KR | 20070106874 A | 11/2007 |
| KR | 20090017268 A | 2/2009 |
| KR | 20090043046 A | 5/2009 |
| KR | 20090043839 A | 5/2009 |
| KR | 10-2012-0009843 A | 2/2012 |
| KR | 10-2012-0139454 A | 12/2012 |
| KR | 10-2013-0056767 A | 5/2013 |
| KR | 20130056767 A | 5/2013 |
| WO | 0/067183 A1 | 11/2000 |
| WO | 2014/209517 | 12/2014 |
| WO | 2014/209900 | 12/2014 |

OTHER PUBLICATIONS

Office Action dated Nov. 27, 2018 for Japanese Patent Application No. 2017-106049, 11 pages.
International Preliminary Report on Patentabiity and Written Opinion received for PCT Patent Application No. PCT/US2014/038759, dated Jan. 7, 2016, 7 pages.
International Search Report with Written Opinion received for PCT Patent Application No. PCT/US2014/038759, dated Sep. 30, 2014, 10 pages.
International Preliminary Report on Patentability and Written Opinion received for PCT Patent Application No. PCT/US2014/043698, dated Jan. 7, 2016, 9 pages.
International Search Report and Written Opinion received for PCT Application No. PCT/US2014/043698, dated Oct. 21, 2014, 12 pages.
Wouhaybi, et al., "Digital Receipts Economy", U.S. Appl. No. 14/780,531, filed Sep. 26, 2015, 50 pages.
Office Action dated Dec. 13, 2016 for Japanese Application No. 2016-521888, 4 pages.
Office Action dated Jul. 12, 2018 for Japanese Patent Application No. 2017-106049, 6 pages.
Extended European Search Report dated Nov. 11, 2016 for European Application No. 14817760.3, 7 pages.
Office Action dated Jun. 3, 2019 for European Patent Application No. 14817760.3, 9 pages.

(56) References Cited

OTHER PUBLICATIONS

Office Action dated Jul. 2, 2019 for Japanese Patent Application No. 2017-106049, 4 pages.

* cited by examiner

SELECTIVE SHARING OF USER INFORMATION BASED ON CONTEXTUAL RELATIONSHIP INFORMATION, SUCH AS TO CROWD-SOURCE GIFTS OF INTEREST TO A RECIPIENT

TECHNICAL FIELD

Selective or controlled sharing of information amongst users based on context or contextual relations, such as shared interests, personal relationships, subject matter expertise, commonalities in biographical information, and/or other contextual information.

BACKGROUND

Gift selection is prone to misjudgment as to interests of a recipient, as evidenced by merchandise exchanges (in-store and on-line), and re-gifting. The advent of gift cards was expected to increase recipient satisfaction, since a recipient is able to select from the entire inventory of an entity (e.g., store, restaurant, movie theater, and/or chain). However, the growth of gift cards has been accompanied by a similar growth in secondary markets for selling and trading unwanted or undesired gift cards.

Even where a desire of a recipient is known, selection of an appropriate item from a selection of available items is prone to misjudgment, sometimes due to nuanced personal preferences of the recipient. Example situations are too numerous to list, but a diverse set of examples include situations where a gift giver is to select a new video camera, power tool, jewelry (e.g., earrings), clothing, or entertainment (e.g., a movie or a play). For any of the example scenarios, personal preferences of a particular recipient and/or differences amongst available items may appear nuanced or even indiscernible to one person, but may be readily apparent to another person. Gifting an item that does not sufficiently meet the desires of a recipient may lead to disappointment in the recipient, and may be a waste of money.

Even where a gift giver selects an item that sufficiently meets the desires of a recipient, it is not uncommon for a person to present a gift, only to learn that the recipient already owns the same or similar item. This may result in disappointment and/or embarrassment on the part of the gift giver, who may have anticipated excitement in, and appreciation from the recipient.

SUMMARY

Disclosed herein are methods and systems to selectively share information amongst users based on contexts of relationships, such as common context or commonality under a set of conditions, such as a topic, which may include known topics of relationships amongst the users and/or undiscovered contexts. Such selective sharing or selective disclosure is also referred to herein as contextual disclosure based on contextual relation(s). Examples include, without limitation, shared interests, personal relationships, subject matter competence or expertise, items of interest (e.g., products/services), commonalities in biographical information.

For disambiguation purposes, a user whose information is disclosed to another user may be referred to herein as a recipient. A user to whom recipient information is disclosed is referred to herein as an invitee. A user may be a recipient with respect to a first event and an invitee of a second event. Users are not, however, limited to invitees and recipients.

Examples are provided herein with respect to crowd-sourced gift-giving or gifting applications, in which items of interest to a recipient are selectively disclosed to invitees, and the invitees are permitted to collaborate with one another based on corresponding contextual relations in order to crowd-source a set of gifts of interest or of potential interest to the recipient. In a gift giving application, contextual disclosure may be useful to steer an invitee towards items of interest to a recipient based a shared interest, a personal relationship, subject matter knowledge, commonalities in biographical information, and/or other contextual relation(s). Methods and systems disclosed herein are not, however, limited to gifting applications and/or other recipient/invitee situations.

Contextual disclosure may be useful to limit information disclosure to that which relates to a known and/or newly discovered contextual relation between users. Contextual disclosure may, for example, limit disclosure of information to a subset of invitees whose opinions and/or decisions with respect to a particular issue, item, or topic may be more relevant than opinions/decisions of other invitees.

In a gift giving application, contextual disclosure may be useful to steer an invitee towards items of interest to a recipient based a shared interest, a personal relationship, subject matter knowledge, commonalities in biographical information, and/or other contextual relation(s).

Contextual disclosure in combination with collaborative or crowd-sourced evaluation may improve prospects that gifts presented to a recipient meet interests and desires of the recipient. For example, where a recipient has an interest in tennis and is interested in obtaining a new tennis racquet, the recipient's interest in a new tennis racquet may be disclosed to an invitee who has an interest in tennis or who is otherwise knowledgeable about tennis. The recipient's interest in a new tennis racquet may also be shared with an invitee based on one or more other contextual relation(s), such as a personal relationship, commonalities in biographical information, and/or other relationship context(s).

Contextual disclosure may also help to avoid disclosing information of the recipient in a situation that might cause embarrassment, such as where a family member does not approve of an interest of the recipient or an item for interest to the recipient, or in a situation where a friend knows little or nothing about an, item, interest, or topic of interest to the recipient.

A contextual relation may be known or pre-determined, or may be identified or detected from information of a recipient and an invitee. A newly discovered contextual relation, such as a shared interest, may be useful to expand an existing social relationship and/or as a basis to initiate a social relationship.

With respect to shared interests, for example, items of interest to a user may be grouped or clustered based on relationships amongst the items. A keyword is associated with each group or cluster, and each cluster and associated keyword corresponds to an interest of the user. Keywords of a recipient may be compared to keywords of an invitee to identify a set of one or more common keywords for the invitee, where the common keyword(s) correspond to shared interests of the recipient and the invitee. Recipient information may be disclosed to an invitee if the recipient information relates to a common keyword of the invitee. Keyword and/or item level security designations may be applied to further control disclosure of user information.

A private workspace may be provided to each invitee of an event, and recipient information may be selectively disclosed within the private workspaces based on contextual relations associated with the respective invitees. Invitees may be permitted to add items to the respective workspaces, such as by scanning a barcode or selecting an item within a browser. An item added to a workspace may be scored based on a likelihood that the item is of interest to the recipient.

A shared workspace, or market may be associated with the event, and invitees may be permitted to move items from the respective private workspaces to the market for crowd-based consideration/evaluation, such as to crowd-source a set of items of interest or of potential interest to the recipient. Invitees may be provided with contextual views of the market based on respective contextual relations. Invitees may be permitted to submit comments and/or votes with respect to market items presented within the corresponding contextual views.

An invitee may be permitted to purchase or elect a market item for purchase as a gift to the recipient, provided that the item is disclosed within the contextual market view of the invitee.

An invitee may be permitted to elect to participate in and/or to contribute funds toward a crowd-based purchase of a market item as a crowd-sourced gift to the recipient, provided that the market item is presented within the corresponding contextual market view.

BRIEF DESCRIPTION OF THE DRAWINGS

For illustrative purposes, one or more features disclosed herein may be presented and/or described by way of example and/or with reference to one or more drawing figured listed below. Methods and systems disclosed herein are not, however, limited to such examples or illustrations.

Figure 1:
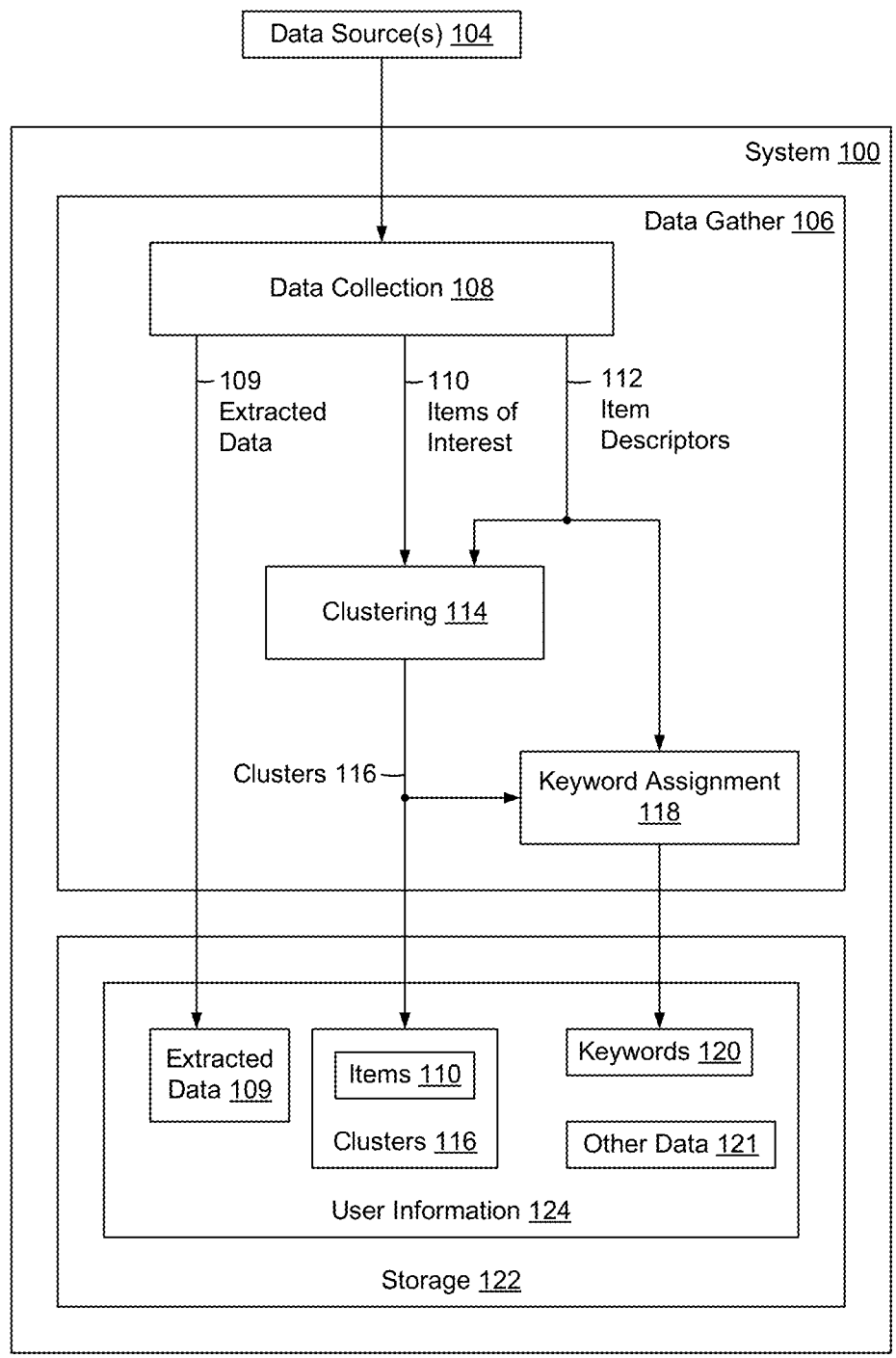
FIG. 1 is a block diagram of a system to identify items of interest and cluster the items of interest based on corresponding descriptive data to provide subject matter-based clusters of the items, or clusters of contextually related items.

In the drawings, the leftmost digit(s) of a reference number identifies the drawing in which the reference number first appears.

DETAILED DESCRIPTION

FIG. 1 is a block diagram of a system 100 to identify items of interest and to cluster the items of interest based on corresponding descriptive data to provide subject matter-based clusters of the items. System 100 may be configured to identify the items of interest with respect to a user, in which case each cluster may represent a corresponding interest of the user.

The term "user," as used herein, may include an individual, a group/crowd of individuals, and/or an entity or group of entities. For illustrative purposes, one or more examples herein may designate a user with an arbitrary name (e.g., Alice or Bob). Not inferences should be drawing from such arbitrary names.

The term "item," as used herein, may include a product or service.

The term "source," as used herein, may include, without limitation, a vendor or store, a store location, a manufacturer, producer, distributor, and/or a service provider.

The term "communication network," as used herein, may include, without limitation, a wired network, a wireless network, a packet-based network, a telephone network, a public network, and/or a private network.

The term "availability data," as used herein, may include data related to inventory, source, location, and/or cost.

The term "cost," as used herein, may include a list or base price, and/or a promotion, such as an applicable coupon, discount, credit, and or customer rewards or customer loyalty program.

In FIG. 1, system 100 includes a data gather system 106 that includes a data collection module 108 to identify items of interest (items) 110 and descriptions of items 110, illustrated here as item descriptors 112. Items 110 may include items purchased and/or owned by a user, and/or items desired by the user.

Data collection module 108 may be configured to represent items 110 as data objects, such as database entries, graph nodes, and/or other computer-readable representations. Data collection module 108 may be further configured to tag or append item descriptors 112 to the corresponding data objects (e.g., as metadata). Item descriptors 112 may also be referred to herein as descriptive tags, or descriptive metadata. Data collection module 108 may be further configured to tag or append information to an item to indicate whether the item has been purchased and/or is owned by the user, or is desired by the user (e.g., for a gift-giving application described further below).

Data gather system 106 further includes a cluster module 114 to cluster items 110 based on corresponding item descriptors 112, and to output corresponding clustered items (clusters) 116. Cluster module 114 may be configured to cluster items 110 based on similarities and/or dissimilarities of item descriptors 112. An item 110 may be assigned to one or more clusters 116.

Cluster module 114 may be dynamically configurable (e.g., automatically and/or user-configurable), with respect to granularity, assignment criteria, and/or other factors, such as to manage or regulate clusters or buckets that represent topics of interest to a user as represented by different items of interest to the user identified from the data collection. Bucket regulation may include regulation of a number of buckets, distinctions, and/or distances between buckets, and/or subject matter of one or more of buckets. Cluster module 114 may map to pre-defined negotiated clusters amongst user data or user applications or may be user-specific. Cluster module 114 may, for example, permit a user to select and/or define one or more assignment criteria of a bucket, in addition to and/or instead of item descriptors 112. Cluster module 114 may permit a user to associate an item in a cluster 116 with one or more other clusters 116, and or to move an item from one cluster 116 to another cluster 116 (i.e., override a clustering decision).

Data gather system 106 may include an automated keyword assignment module 118 to assign, associate, and/or append a set of one or more tags or keywords 120 to each cluster 116. Keywords 120 may include descriptive keywords. Keywords may be determined and/or selected for a cluster based on item descriptors 112 of the items assigned to the cluster. Alternatively, or additionally, keyword assignment module 118 may be configured to interface with public databases and/or application programming interfaces (APIs) that collect user-generated tags and/or or ontology assigned keywords.

Where items 110 represent items of interest of a user, each cluster 116 may inherently represent interest of the user. In this example, clusters 116 and corresponding descriptive keywords 120 may permit more intuitive data interaction by the user and/or with respect to the user, examples of which are provided further below.

Clusters 116 and/or associated descriptive keywords 120 may be accessible to an application, examples of which are provided further below.

Data collection module 108 may be configured as described below with reference to FIG. 2. Data source(s) 104 may include one or more data sources described below with reference to FIG. 2. Data collection module 108 and data source(s) 104 are not, however, limited to the example of FIG. 2.

Figure 2:
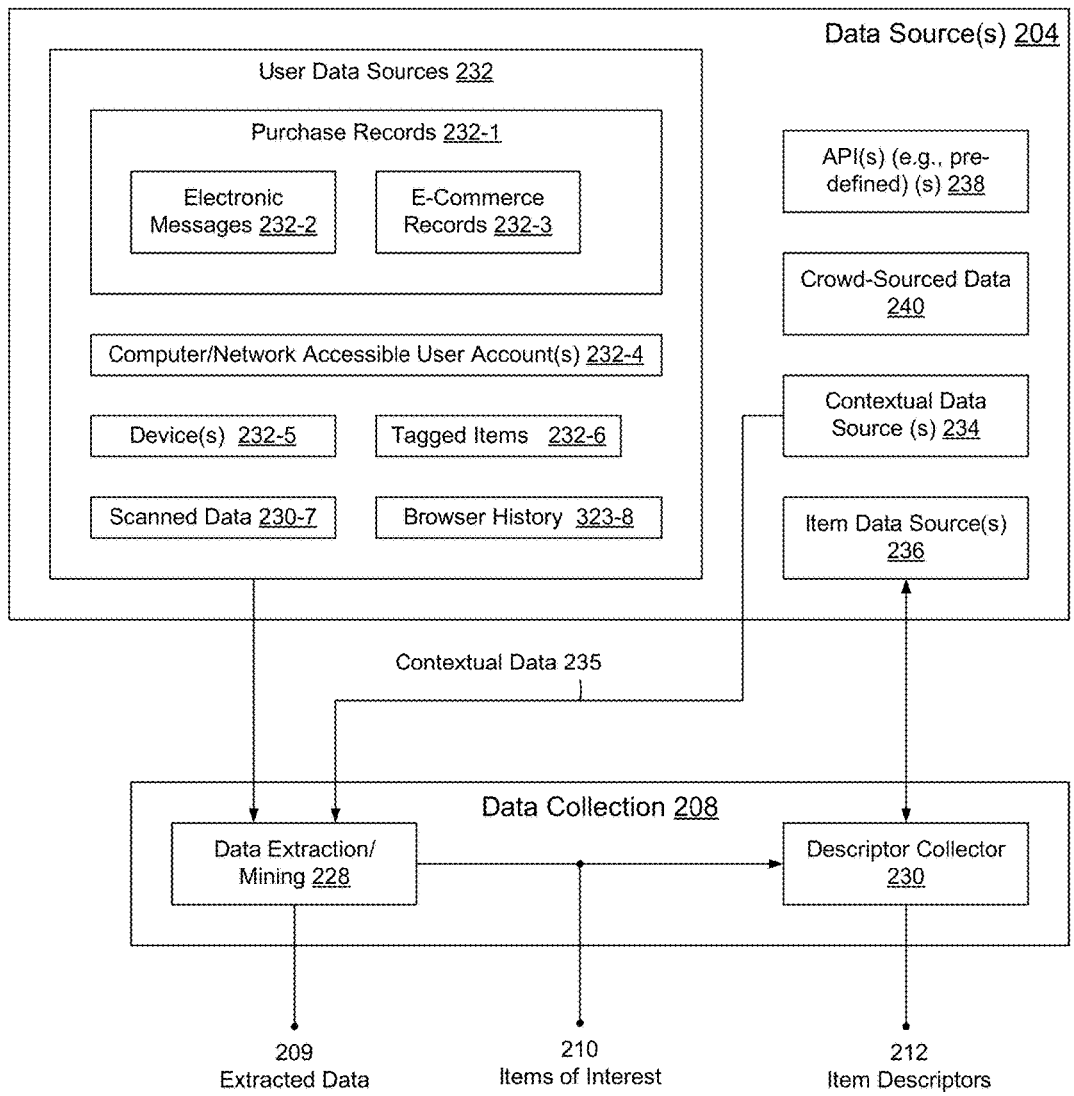
FIG. 2 is a block diagram of a data collection system to collect computer-readable data from one or more data sources.

FIG. 2 is a block diagram of a data collection system 208 to collect computer-readable data from one or more data sources 204, which may be accessible over one or more communication networks (e.g., through a local and/or web based application, such as a browser).

In FIG. 2, data collection module 208 includes a data extraction/mining module 228 to extract data 209 from data sources 204, and identify items of interest 210 from data sources 204 (e.g., items purchased by the user, items owned by the user, and/or items desired by the user).

Data extraction/mining module 228 may be configured to extract or mine data from one or more devices and/or accounts associated with a user, collectively referred to herein as data mining targets. A data mining target may include, without limitation, a user wish list (e.g., shopping list), browsing history, an electronic message account (e.g., e-mail and/or text), a telephone account, a financial account (e.g., a bank account and/or user account with a vendor), and/or an account with a network-hosted service such an Internet-based social and/or professional networking service. In FIG. 2, data mining targets include one or more user data sources 232.

A user data source 232 may include a source of user-tagged items 232-6. A source of user-tagged items 232-6 may include an electronic shopping list and/or wish list, which may be stored in one or more of a user device, a user account, and/or a vendor server, which may be accessible through a computer-based interface (e.g., browser and/or web app).

A user data source 232 may include a source of browser history 323-8, which may include browser history associated with sources of items (e.g., on-line vendor sites), and/or items viewed, tagged, and/or purchased by the user.

A user data source 232 may include a source of scanned data 230-7. Scanned data 230-7 may include data scanned from a bar code printed on an item label or package, and/or a radio frequency identification (RFID) associated with an item.

A user data source 232 may include a computer and/or network accessible user account 232-4 and/or include one or more user devices 232-5.

A user data source 232 may include one or more sources of user purchase records 232-1, also referred to herein as digital receipts.

A purchase record 232-1 may be computer-generated (e.g., at the time of purchase), and/or may be an electronically scanned image of a tangible purchase record such as a printed store receipt. Purchase records 232-1 may pertain to items of multiple interests and/or multiple sources of items.

Purchase records 232-1 may include electronic messages 232-2, such as text-formatted purchase receipts sent over a communication network. An electronic message 232-2 may include, without limitation, electronic mail (e-mail) and/or text message. An electronic message 232-2 may be sent from a source and/or payment processor to a user account, user service, and/or user device, which may serve as mining targets for data extraction/mining module 228. Electronic messages 232-6 are not, however, limited to these examples.

Purchase records 232-1 may include E-commerce records 232-3. E-commerce records 232-3 may include itemized purchase records maintained by a vendor, payment processor, financial institution, and/or a service that catalogues electronic receipts for the user (i.e., data mining targets of data extraction/mining module 228). E-commerce records 232-3 may pertain to purchases in cash/check and/or electronic funds. Electronic funds may include financial transaction card purchases (e.g., credit, debit, and/or gift cards), electronic funds transfer (e.g., bank-to-bank), and or digital currency (i.e., virtual or alternative currency used in computer-based virtual economies).

Data extraction/mining module 228 may be further configured to collect contextual data 235 from a contextual data source(s) 234. Contextual data 235 may have some relationship to a user, an item, and/or an interest of the user. Contextual data 235 may include information that may be used to identify a common context or contextual relation(s) between the user and another user, an item, and/or an interest.

Contextual data 235 may include social relationship data which may relate to a family relationship, a professional relationship, a friendship, and/or other inter-personal relationship.

Contextual data 235 may include biographical information of the user, which may relate to a level of knowledge or expertise with respect to a matter, also referred to herein as contextual knowledge and/or contextual expertise. Additional examples of contextual or contextual information are provided further below.

In FIG. 2, data collection module 208 further includes a descriptor collector 230 to collect descriptive information regarding items of interest 210 from one or more data sources 236. The descriptive data is illustrated here as item descriptors 212. A data source 236 may include, without limitation website of a vendor, a store, a public service web site, and/or other data source(s).

Descriptor collector 230 may be configured to identify one or more data sources 236 from which to access/retrieve an item descriptor 212 for an item of interest 210.

Data extraction/mining module 228 and/or descriptor collector 230 may be configured to extract additional data based on extracted data 209, items of interest 210, and/or item descriptors 212, such as:

item details;
another source of an item;
item metadata contributed by seller, manufacturer, and/or customers;
a similar item (from same and/or other source); and/or
item availability data.

Item details may include, without limitation, a manufacturer, producer, grower, and/or distributor, a registered mark, a generic name, and/or labeling data. Label data may include terms such as, without limitation: exclusive, limited, signed, new, used, and/or edition.

Data extraction/mining module 228 and/or descriptor collector 230 may be configured to extract data from a source of crowd-sourced data 240 and/or from an application-programming interface (API) 238, which may include a predefined API.

Data extraction/mining module 228 and/or descriptor collector 230 may be configured to collect data regarding an item that is similar to and/or commercially competitive with an item of interest 210.

Data extraction/mining module 228 and/or descriptor collector 230 may include a browser, a crawling application, and/or scraping application.

Data extraction/mining module 228 may be configured to identify a data source 204 as a mining target.

Data extraction/mining module 228 may be configured to selectively employ one of multiple mining techniques based on a mining target. A mining technique may be selected, for example, based on a device and/or device type, data type (e.g., text-based documents, photographs, and/or videos), data format, an account and/or account type, application through which data is accessible (e.g., a browser, other local application, and/or a web app), privacy constraints, usage goals including sharing/aggregating with others' data.

A mining technique may be configurable with respect to user-specific security features, an application launch procedure, and/or an access sequence (e.g., sequence of web-based sites/pages and/or user selections therein).

Data extraction/mining module 228 may be configured to search and/or extract data related to items of interest 210 and/or subjects/topics of interest to the user (e.g., travel, hiking, tennis, cooking, and/or sports car). Subjects/topics may correspond to clusters of items of interest 210 and associated keywords.

In FIG. 1, system 100 may include one or more storage devices and/or locations, illustrated here as storage 122, to store extracted data 109, clustered items 116, keywords 120, and/or other data 121 (collectively referred to herein as user information 124). Other data 121 may include data derived from data 111 and/or keywords 120, and/or other data, such as context or contextual relation information.

Items 110, contents of clusters 116, keywords 120, and/or data associated with one or more of the above, may be presented to a user for review and/or modification (e.g., to rename clusters, move items amongst clusters 116, collapse or expand clusters 116, delete items 110, and/or override a security setting/access level for one or more items within a cluster 116).

Extracted data 109, clustered items 116, keywords 120, and/or data 121 may include diverse objects or data structures, which may be challenging to manage and/or protect with a conventional pre-defined database structure. Storage 122, or a portion thereof, may be configured as a database for unstructured data, also referred to herein as an unstructured database. Where storage 122 includes an unstructured database, system 100 may include one or more interfaces to search and/or access unstructured data. Such an interface may include, without limitation, a browser-based interface.

Methods and systems are disclosed below to selectively disclose information of a user to one or more other users based on context or contextual relation(s), also referred to herein as context-based disclosure and contextual disclosure. Unless specified otherwise herein, the terms context and contextual relation(s) are used interchangeably. Contextual disclosure may also be utilized to permit subsets of the other users to collaborate with one another with respect to information disclosed to the corresponding other users.

Contextual disclosure may be based on common context or commonality under a set of conditions, such as a topic, which may include known topics of relationships amongst the users and/or undiscovered contexts. Contextual disclosure may be based on, without limitation, a shared interest, a social relationship, and/or biographical information.

A shared interest may relate to an item or a subject/topic (e.g., a keyword 120). A social relationship may include a family relationship, a professional relationship, a friendship, and/or other inter-personal relationship. Biographical information may relate to a level of knowledge or expertise with respect to a matter (e.g., an item and/or subject/topic), also referred to herein as contextual knowledge and/or contextual expertise. Contextual disclosure may also be based on matching biographical information, such as where two users attended the same university, lived within the same geographic region, and/or worked in the same industry and/or for the same entity, at the same time and/or at different times. Contextual disclosure is not, however, limited to these examples.

Contextual disclosure may be useful to identify subjects/topics for which information of a first user should be disclosed to a second user only if the second is interested in the topics as well, and/or if the second user has a particular type of relationship with the first user and/or knowledge or expertise with respect to the topic.

Contextual disclosure may help to avoid disclosing information of a user in a situation that might cause embarrassment, such as where a family member does not approve of an interest of the user or an item for interest to the user, or in a situation where a friend knows little or nothing about an, item, interest, or topic of interest to the user.

In a gift giving application, contextual disclosure may be useful to steer an invitee towards items of interest to a recipient based a shared interest, a personal relationship, subject matter knowledge, commonalities in biographical information, and/or other contextual relation(s). Contextual disclosure may improve prospects that gifts presented to a recipient meet interests and desires of the recipient.

For example, where a recipient has an interest in tennis and is interested in obtaining a new tennis racquet, the recipient's interest in a new tennis racquet may be disclosed to an invitee who has an interest in tennis or who is otherwise knowledgeable about tennis. The recipient's interest in a new tennis racquet may also be shared with an invitee based on one or more other contextual relation(s), such as a personal relationship, commonalities in biographical information, and/or other relationship context(s).

Figure 3:
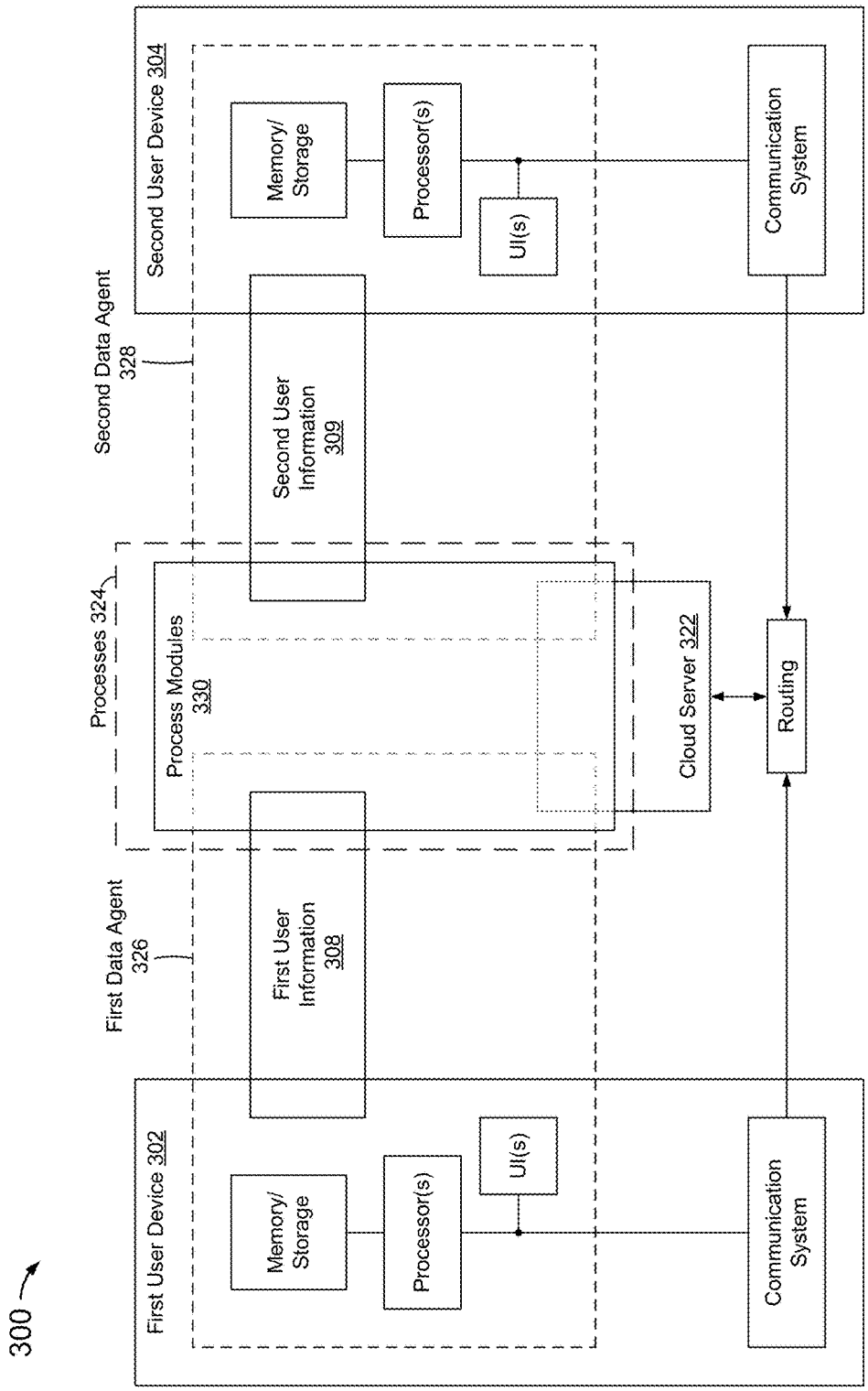
FIG. 3 is a block diagram of a system or system architecture to contextually disclose information amongst users and permit subsets of the users to collaborate with one another based on context or contextual relations.

FIG. 3 is a block diagram of an architecture 300 to contextually disclose information amongst users and permit subsets of the users to collaborate with one another based on context or contextual relations.

Architecture 300 includes first and second user devices 302 and 304, respectively, and may further include a server or cloud server 322. First and second user devices 302 and 304 and cloud server 322 may each include one or more processors, memory and/or other storage devices/systems (memory), and one or more user interfaces or UI(s).

A UI may include a human interface device (HID) and/or a module to present and receive information to/from a HID. The term module, as used herein, may include circuitry/hardware, a processor-based system or a portion thereof (e.g., computer readable instructions encoded within a transient and/or non-transient computer readable medium), and combinations thereof.

A HID may include a display/monitor, a pointer device or touch sensitive pad, and/or a keyboard (mechanical and/or display-based or virtual). A display/monitor may include a touch-sensitive display such as provided with conventional hand-held mobile telephones and personal computing devices (e.g., "pad" computers).

A UI may be configured, for example, to present a browser and/or other graphical user interface (GUI) on a display or monitor.

First and second user devices 302 and 304 and cloud server 322 may each include a corresponding communication system to communicate with one another. A communication system may include wired and/or wireless communication components, devices, and/or systems, and may be configured to communicate over a packet-based network (e.g., the Internet and/or a proprietary network), and/or other network type(s), such as a voice-based or telephone network.

Architecture 300 further includes information associated with first and second users, illustrated here as first user information 308 and second user information 309. First and second user information 308 and 309 may reside on corresponding user devices 302 and 304, cloud server 322, and/or combinations thereof. First user information 308 and/or second user information 309 may represent an example embodiment of user information 124 in FIG. 1.

Architecture 300 further includes one or more process modules 330 to perform processes 324 with respect to first user information 308 and/or second user information 309. A process module 330 may include hardware/circuitry, a processor/memory system (e.g., computer readable instructions encoded within a computer readable medium), and combinations thereof. Example process modules are disclosed further below with reference to FIG. 4.

Architecture 300 may include a data agent to act on behalf of a user, such as to manage or control access to information of the user (e.g., to handle access requests from other users and/or data agents), and to interface with other data agents, such as to request information of other users. A data agent may operate within a user device and/or across multiple devices (e.g., a user device and a cloud server).

In FIG. 3, a first data agent 326 is defined to include portions of architecture 300 to manage (e.g., authorize and/or perform) processes 324 with respect to first user information 308. First data agent 326 is illustrated here as including processor(s), memory/storage, and UI(s) of first user device 302, first user information 308, a portion of cloud server 322, and at least a portion of process modules 330.

A second data agent 328 is defined to include portions of architecture 300 to manage (e.g., authorize and/or perform) processes 324 with respect to second user information 309. Second data agent 328 is illustrated here as including processor(s), memory/storage, and UI(s) of second user device 304, second user information 309, a portion of cloud server 322, and at least a portion of process modules 330.

A data agent may be configured to send requests (e.g., queries or inquiries) and/or commands to other data agents, and to process and/or respond to requests and/or commands of other data agents. Data agents are not, however, limited to the examples above.

First data agent 326 and second data agent 328 may each include a corresponding set of process modules 330 dedicated to the respective data agent, and/or may share one or more process modules 330. Where a process module 330 is dedicated to a data agent, the process module may reside and/or be configured to operate on a corresponding user device, cloud server 322, and/or combinations thereof. A shared process module 330 may reside and/or be configured to operate on cloud server 322.

In an embodiment, cloud server 322 is configured to host process modules 330, or a portion thereof, as part of a cloud-based application or service (e.g., a web application or web app). In this embodiment, user devices 302 and 304 may be configured to access the cloud service through corresponding UIs, which may include browser-based UIs. Methods and systems disclosed herein are not, however, limited to cloud-based services.

A data agent, alone and/or in combination with a process module 330, may be configured to contextually disclose information of the corresponding user to one or more other users, and to permit subsets of other users to collaborate with one another with respect to portions of the disclosed information based on context. Examples are provided below with respect to a gift-giving application. Architecture 300 is not, however, limited to a gift giving application.

Figure 4:
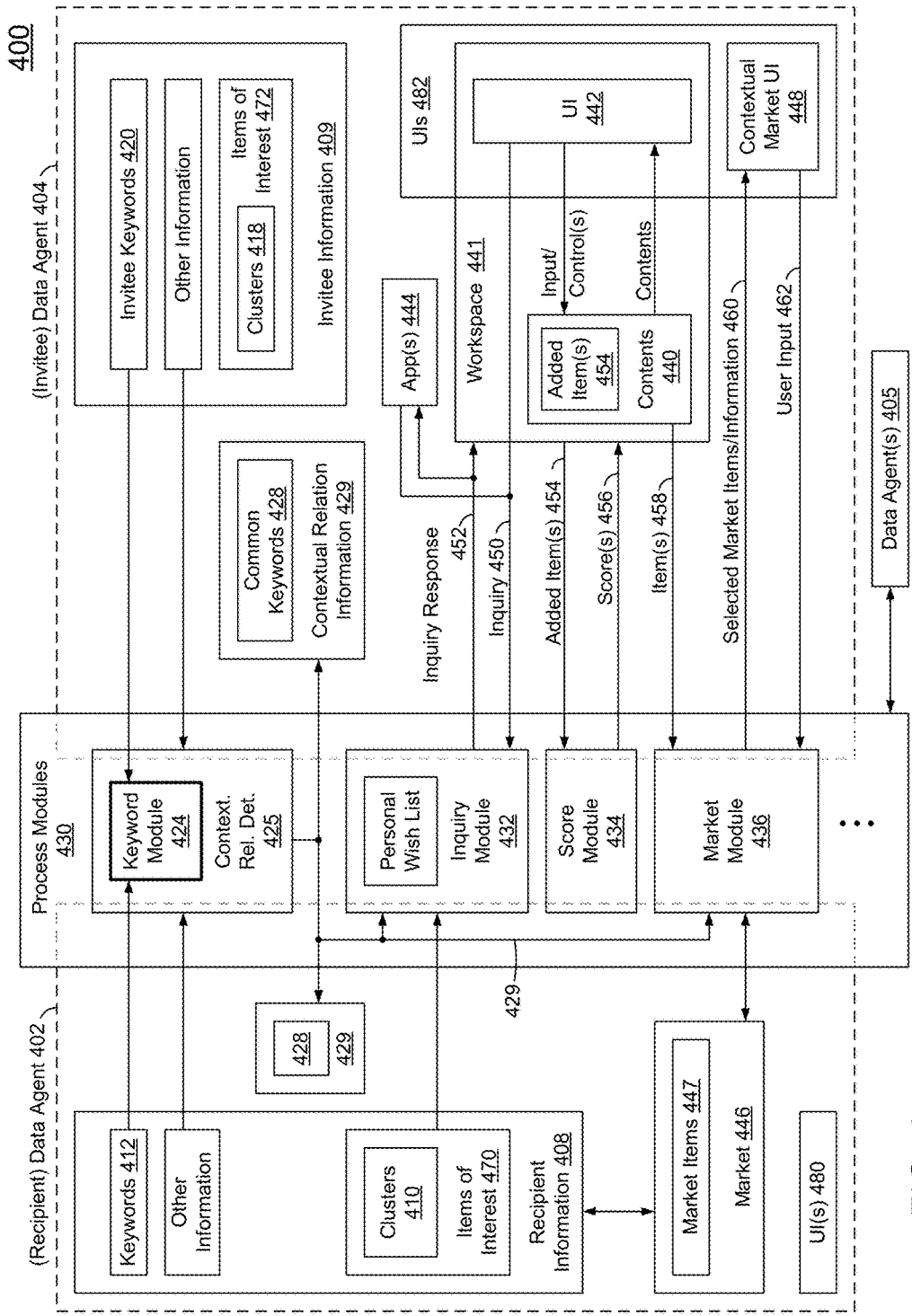
FIG. 4 is a block diagram of a system to disclose information of a first user within private workspaces of other users and to provide a shared workspace or market to permit subsets of the other users to collaborate with one another, based on contexts or contextual relations associated with the respective users.

FIG. 4 is a block diagram of a system 400 to contextually disclose information of a first to one or more other users and to permit subsets of the other users to collaborate with one another with respect the disclosed information based on context.

System 400 may be configured as described above with reference to architecture 300 in FIG. 3. System 400 is not, however, limited to the example of FIG. 3.

System 400 is described below with respect to a crowd-sourced gifting application, to contextually disclose items of interest of a first user to other users, and to permit the other users to collaborate with one another to identify (i.e., to crowd-source) gifts for the first user.

In examples below, the first user may be referred to as a gift recipient or recipient, and the other users may be referred to as gift givers or invitees. A user may be a recipient with respect to a first situation (e.g., a first event), and an invitee with respect to a second situation (e.g., a second event).

System 400 includes data agents 402, 404, 405, and process modules 430 to perform processes on behalf of and/or under control of one or more of the data agents. Each data agent is associated with a corresponding user and is configurable to selectively disclose information of the corresponding user to data agents of other users based on contextual relations between respective users. Contextual relation information 429 may be specific to an invitee and/or specific to a combination of an invitee and a recipient. In FIG. 4, data agents 402 and 404 each include contextual relation information 429 corresponding to contextual relation(s) between respective first and second users.

Data agents 402, 404, 405 may be technically and/or functionally similar or identical to one another in that each may be configured to perform recipient and invitee functions. In FIG. 4, data agents 402 and 404 each include one or more processors and memory, respective UIs 480 and 482, and respective user information (i.e., recipient information 408 and invitee information 409), such as described above with respect to FIG. 3.

In FIG. 4, recipient data agent 402 includes a market 446 associated with recipient information 408. Market 446 may serve as a shared or collaborative workspace to which invitees may add market items 447 and collaborate with one another with respect to market items 447 based on corresponding contextual relation information. Market items 447 may represent crowd-sourced potential gifts for the recipient.

Market 446 may be associated with a recipient event, and market items 447 may represent crowd-sourced potential gifts for the event. Market 446 is not, however, limited to events.

An event may be initiated as a gift-giving event, such as a birthday or other anniversary, a religious event, a dinner party, and/or a workplace event. In this example, market 446 may be inaccessible to the recipient prior to the event. This may be useful to maintain an element of surprise, and/or to keep the recipient distant from gifting negotiations and/or debates amongst the invitees, some of which may have undesirable social consequences. A gift-giving event may be initiated by a user other than the recipient, and invitees may be identified, selected, and/or invited based on a social network of the recipient, such as by data mining a social network graph, records of prior communications, and/or other information source(s).

An event may also be initiated by the recipient, such as for a family reunion, a potluck event, and/or a workplace event. In this example, invitees may be identified, selected, and/or invited by the recipient, and the recipient may have immediate access to the corresponding market.

In FIG. 4, invitee data agent 404 includes a workspace 441 to permit the invitee to privately evaluate items (i.e., privately with respect to other users, invitees, and/or the recipient). Workspace 441 includes contents 440 and a UI 442 to permit the invitee to privately populate, view, interact with contents 440, and move items from contents 440 to market 446.

Workspace UI 442 may include an inquiry UI to permit the invitee to submit inquiries 450 to data agent 402 and/or other data agent(s). The inquiry UI may include a text box to permit the invitee to submit a textual inquiry 450 (e.g., a structured or unstructured query, such as a search term or phrase and/or other search and/or filter parameter). The inquiry UI may include one or more pre-configured user-selectable inquiries, search parameters, and/or filters (e.g., as a menu or list). Inquiries 450 are discussed further below with reference to process modules 430.

Workspace UI 442 may be further configured to permit the invitee to add item 454 to contents 440 from other than recipient information 408. A user device may, for example, be configured to electronically and/or optically scan a feature associated with and/or affixed to an item, such as a barcode and/or a radio frequency identifier (RFID). As another example, workspace UI 442 may be configured to add an item 454 to contents 440 upon user-selection of the item within a browser window. Workspace 441 may be further configured to retrieve descriptive information regarding an added item 454.

Invitee data agent 404 further includes a contextual market UI 448 to permit the invitee to view and interact with market items 447 based on contextual relation information 429, examples of which are provided further below.

Market 446, workspace 441, and workspaces of other data agents 405, may be associated with an event, and may be inaccessible to the recipient prior to the event, such as to maintain an element of surprise. Market 446 and/or the workspaces may be accessible to the recipient after the event.

Invitee data agent 404 may include one or more application modules, illustrated here as app(s) 444, to submit inquiries 450 to recipient data agent 402, with or without input of the invitee.

Process modules 430 are now described.

Process modules 430 may include a contextual relation extractor or detector 425 to identify contextual relation information 429 (e.g., to identify common context or contextual relation(s) and/or to determine an extent or quality of a common context or contextual relation(s)).

Contextual relation detector 425 may be configured to provide contextual relation information 429 to data agent 402 and/or data agent 404. Data agent 402 and/or data agent 404 may be configured to provide common keywords 428 (and/or other contextual relation information 429) to one or more process modules 430 and/or to an application 444.

Data agent 402 and/or data agent 404 may be further configured to disclose common keywords 428 through respective UIs 480 and 442. This may be useful to permit the recipient and invitee (and/or one or more other invitees), to decide whether to expand upon an existing social relationship and/or initiate a social relationship with the other user.

Contextual relation detector 425 may be configured to identify contextual relation information 429 based on invitee information 409, recipient information 408, and/or other information, examples of which are provided below with respect to shared user interests. Contextual relation detector 425 is not, however, limited to shared user interests and may be configured to identify one or more other types of contextual relation information such as, without limitation, social relationship information, and/or biographical information, examples of which are provided further below.

In the example of FIG. 4, contextual relation detector 425 includes a keyword module 424 to identify shared interests of the recipient and the invitee based on recipient keywords 412 and invitee keywords 420. Keywords 412 and 420 may correspond to interests (e.g., topics/subjects) of the respective users, and keyword module 424 may be configured to compare keywords 412 and 420 to identify a set of one or more keywords in-common to the recipient and the invitee, illustrated here as common keywords 428. Each common keyword 428 may represent a shared interest of the recipient and the invitee.

Contextual relation detector 425 may further include a user interest detection module to identify items of interest to the users (e.g., items of interest 470 and 472), cluster the items of interest (e.g., clusters 410 and 418) based on relatedness of the items, and associate keywords (e.g., keywords 412 and 420) with the respective clusters, such as described above with respect to FIG. 1 and/or FIG. 2.

Keyword module 424, or other keyword module(s), may be configured to identify a set of one or more common keywords for each invitee of an event.

Keyword module 424, or other keyword module(s), may be configured to identify a set of common keyword(s) for each event for which a user is an invitee.

Keyword module 424 may be configured to preclude disclosure of a user keyword to another user if the user keyword does not match a keyword of the other user.

Keyword module 424 may be configured to compare keywords within a protected domain or environment that inaccessible to unauthorized applications, processes, threads, and/or users (e.g., inaccessible to data agents 402 and 404, corresponding users, and other process modules 430). The protected domain may include an access-protected region of memory, a hardware/firmware based trusted execution environment (TEE), a system management mode (SMM), a virtual machine (VM), an out-of-bound (OOB) channel, and/or other environment, module, and/or technique. A protected domain may be configured within a user device, a cloud server, and combinations thereof.

Keyword module 424 and/or another module may be configured to maintain a database of keywords and/or common keywords of multiple users, and may be maintained in a protected domain. Keywords may, for example, be collected in the background (e.g., on a "swipe from a user application").

In FIG. 4, process modules 430 further include an inquiry module 432 to permit recipient data agent 402 to handle inquiries 450 from invitee data agent 404 based on contextual relation information 429. Inquiry module 432 may be configured to select and/or limit recipient information 408 returned to data agent 404 in a response 452 based on context or contextual relation information 429.

In an embodiment, inquiry module 432 is configured to disclosure recipient information 408 to an invitee if there is sufficient contextual relation to the invitee. Because contextual relation information varies amongst invitees, disclosure of recipient information 408 is personalized with respect to each invitee. For example, a subset of items of interest 470 may be disclosed to data agent 404 as a personalized wish list of items of interest to the recipient. The subset of items of interest 470 may be added to contents 440 of workspace 441 for consideration or evaluation by the invitee as potential gifts for the recipient.

Inquiry module 432 may be configured to provide a personalized wish list to invitee data agent 404 based on an explicit inquiry 450 from the invitee (i.e., through UI 442), and/or based on an implicit request, such as in response to an initial communication from invitee data agent 404 to recipient data agent 402. For example, UI 442 may be configured to present a list of events for which the user is an invitee, and may be further configured to send an event ID to recipient data agent 402 upon selection of a recipient event. In this example, inquiry module 432 may be configured to provide a personalized wish list to invitee 404 upon receipt of the event ID.

Inquiry module 432 may be further configured to invoke keyword module 424 to determine common keywords 428 upon receipt of the event ID, and to provide a personalized wish list to data agent 404 based on common keywords 428 (i.e., based on shared interests). In this example, inquiry module 432 may be configured to populate the personalized wish list with items 470 of a cluster 410 if the keyword 412 associated with the cluster 410 matches a recipient keyword 420. In an embodiment, inquiry module 432 is configured to preclude disclosure of an item of interest 470 if the item or the associated keyword 412 is designated private, such as described further below with reference to FIG. 5.

Inquiry module 432 may be configured to limit the number of items of interest 470 disclosed in an inquiry response 452. The limit may be based on a threshold, a number of items currently in workspace 441, and/or a number of items per interest or topic.

Inquiry module 432 may be configured to restrict items disclosed in an inquiry response 452 based on a relevance factor, which may be based on a nature, extent, and/or type of shared interest(s), and/or which may be based on the desirability of an item to the recipient (e.g., extent or degree of recipient interest).

Inquiry module 432 may be configured to restrict an inquiry response 452 based on a surprise factor.

Inquiry module 432 may be configured to restrict an inquiry response 452 based on a comfort zone factor, which may be based on keyword comparison. As an example, if an interest of a first user is a subset of an interest of a second user, information corresponding to the interest may be deemed outside of a comfort zone unless it pertains to the subset of the interest. Other examples include a situation where the first user is an expert in a field while the user is a novice in the field.

Inquiry module 432 may be configured to restrict an inquiry response 452 based on one or more user-configurable parameters. A user-configurable parameter may include, without limitation, a price restriction (e.g., price range and/or price limit), a geographic area or range, a vendor, store, or manufacturer, and/or other parameter(s), which may be configurable through workspace UI 442.

In FIG. 4, process modules 430 further include a score module 434 to assign a score 456 to an item 454 added to workspace 441 by the invitee from a source other than recipient information 408. Score 456 may be indicative of a likelihood that an item 454 is of interest to the first user. Score module 434 may be configured to determine assign score 456 based on an explicit request from the invitee through workspace UI 442, and/or automatically when item 454 is added to workspace 441.

Score module 434 may be configured to assign score 456 based on recipient information 408, invitee information 409, and/or contextual relation information 429. For example, score module 434 may be configured to assign score 456 based on an extent to which the item relates to an interest of the recipient, an extent to which the item relates to a shared interest/common keyword 428, and/or an extent, number, and/or quality of shared interests between the invitee and the recipient. Score 456 may also be based on a social relationship between the recipient and the invite and/or biographical information, such as knowledge, competence, or expertise of the invitee with respect to the item and/or with respect to an associated topic or interest.

Score module 434 may be configured to determine score 456 based on other items in market 438, some of which may not be presented within UI 442 of the invitee.

Score module 434 may be configured to determine score 456 based on metadata or item descriptors.

Score module 434 may be configured to determine score 456 based on whether the recipient already owns a similar item, such as a similar or competing item from another manufacturer.

Score module 434 may be precluded from assigning score 456 if item 454 is already owned by the recipient, is already in market 446, and/or has been purchased or elected for purchase in market 446 as a gift to the recipient.

Score 456 may be disclosed to the invitee, such as to permit the invitee consider the score in deciding whether to move item 454 to market 446, and/or in deciding whether to expand a relationship with the recipient or remain in a comfort zone.

Score module 434 may be configured to limit the number of added items 454 for which to assign a score 456, per invitee. This may help to preclude an invitee from inferring interests of the recipient and/or items of interest to the recipient based on scores assigned to numerous items.

Score module 434 may be precluded from assigning score 456 to an item 454 if the item is not sufficiently related to an invitee keyword 420, and/or sufficiently related to a common keyword 428. Sufficiency may be based on a threshold measure of relatedness.

Score module 434 may be precluded from assigning score 456 if item 454 relates to an interest (i.e., cluster 410) designated private by the recipient. Privacy designations are described further below with reference to FIG. 5.

In FIG. 4, process modules 430 further include a market module 436 to manage market 446, including to permit invitees to collaborate with one another based on corresponding contextual relation information 429. Market 446 and market module 436 together, may serve as a tool to crowd-source items that are likely to be of interest to the recipient.

Market module 436 may be configured to add an item(s) 458 to market 446 based on a request or command from workspace 441.

Market module 436 may be configured to associate information of the invitee with the item. The information may include identity and/or contextual information, such as a relevant shared interest with the recipient, a social relationship with the recipient, and/or biographical information (e.g., relevant knowledge, expertise, hobby, training, profession, and/or biographical commonalities with the recipient).

Where a score 456 is assigned to item 458 by score module 434, market module 436 may be configured to retain the score in association with the item in market 446. Market module 436 may be configured to reject an item market 446 if an assigned score is below a threshold.

Market module 436 is further configured to selectively disclose selected market items/information 460 to contextual market UI 448 based on contextual relation information 429. Because contextual relation information differs amongst the invitees, selected market items/information 460 serves as a personalized or invitee-specific view of market 446.

Market module 436 is further configured to permit invitees to collaborate with one another with respect market items 447 based on contextual relation information of the corresponding invitees, such as described in examples below.

In an embodiment, market module 436 is configured to permit invitees to submit user input regarding items and/or information presented within corresponding contextual market UIs 448. In FIG. 4, the invitee is permitted to submit user input 462 regarding selected market items/information 460.

User input from multiple invitees regarding a market item 447 may serve as reference points indicative of a degree to which the item is of interest or likely to be of interest to the recipient. User input 462 from multiple invitees may thus be used to predict or infer a likelihood of recipient interest in the item. User input 462 from multiple invitees may, for example, be used to score the market item and/or modify a previously assigned score.

User input 462 associated with a market item 447 may be weighted based on contextual information, such as extent, number, and/or quality of shared interests, social relationships, and/or competence/expertise with respect to the item and/or with respect to an topic or subject associated with the item, examples of which are provided further below.

User input 462 may include, without limitation, a comment, a vote, and/or purchase election. Purchase elections are described further below.

A comment may be directed to a market item and/or user input submitted by another invitee.

An invitee may vote in approval or disapproval (i.e., in favor of, or against) of an item as a potential gift for the recipient. Since the item is only presented in the contextual market UIs of selected invitees (i.e., based on common context and/or contextual relation), voting is limited to the selected invitees.

Votes of multiple invitees may be tallied, such as by number of votes in favor, number of votes against, and/or aggregate number of votes. The tally may serve as a measure of a likelihood of recipient interest in the item.

A vote may be weighted based on a contextual relation information 429 of the voter and/or other factor(s). An example is provided for a situation in which 10 users vote in favor of an item and 3 vote against the item. Of the 10 votes in favor, 2 may be from experts in the relevant field and 1 may be from a user who has a close social relationship with the recipient (e.g., family member or a close personal friend). The votes from the experts and/or the vote from the user who has a close social relationship with the recipient may be weighted more heavily than votes of one or more other users.

Market module 436 may be further configured to associate information of an invitee with user input submitted of the invitee. The information may include identity and/or contextual information, such as described above with respect to an item 458 added to market 446 by an invitee.

User input 462 and/or information of the invitee may be disclosed to other invitees based on contextual relation information of the respective other invitees. User input 462 and/or information of the invitee may thus be disclosed to some invitees and withheld from other invitees.

Market module 436 may be configured to permit an invitee or a group of invitees to elect a market item 447 disclosed within respective contextual market UIs as a gift for the recipient. Market module 436 may be configured to detect a purchase of a market item 447 by an invitee from an electronic purchase record.

Market module 436 may be configured to permit an invitee to propose an item presented within the contextual market UI 448 of the invitee as a crowd-sourced gift for the recipient, and to permit other invitees to submit user input and/or contribute funds to purchase the item as crowd-sourced gift for the recipient.

Market module 436 may be configured to preclude subsequent election of a market item 447 if the item is elected for purchase and/or purchased as a gift for the recipient.

Market module 436 may, for example, be configured to isolate the item, such as by tagging, hiding, or removing the item from market 446. Similarly, inquiry module 432 may be configured to exclude the item from subsequent inquiry responses 452 (e.g., to exclude the item from subsequent personalized wish lists).

System 400 may be configured to permit an invitee to submit an inquiry 450 (e.g., to request a personalized wish list of items of interest to the recipient, or a personalized recommendation of possible gifts for the recipient), receive a corresponding inquiry response 452, obtain a score 456 for an added item 454, elect a market item 447 for purchase, report a purchase of a market item 447, and/or elect to participate in a crowd-sourced gift, anonymously relative to other invitees.

System 400 may be further configured to preclude access to market 446, and/or workspace 441 and workspaces of other users, by the recipient prior to an event associated with market 446, such as to maintain an element of surprise as described further above. System 400 may be further configured to permit access to market 446, and/or workspace 441 and workspaces of other users, by the recipient subsequent to the event.

In an embodiment, data gather system 106 (FIG. 1) is configured to weight keywords 120 based on one or more factors. A keyword weight may be based a measure of user interest with respect to a subject matter or topic of a corresponding cluster 116 and/or may be indicative of a level of user expertise with respect to a subject matter of the cluster 116.

In FIG. 4, system 400 may be configured to selectively perform one or more functions with respect to a weighted user keyword. For example, and without limitation, invitee module 432 may be configured to disclose an item of interest 470 to an invitee if the item relates to a common keyword 428 and a weight associated with the corresponding invitee keyword meets or excess a sufficiency threshold.

As another example, where an invitee adds an item 454 to workspace 441, score module 434 may be configured to identify an invitee keyword 420 that relates the added item, and to assign a score 456 to the added item based at least in part on a weight associated with the invitee keyword 420.

As another example, where the invitee seeks to move an item 458 from workspace 441 to market 446, market module 434 may be configured to identify an invitee keyword 420 that relates to the item, and to selectively move the item to market 446 based at least in part on a weight associated with the invitee keyword.

As another example, market module 426 may be configured to select market items/information 460 for disclosure within contextual market UI 448 based on a combination of common keywords 428 and weights associated with corresponding invitee keywords 420.

As another example, where the invitee submits a vote with respect to a market item 447, market module 426 may be configured to identify an invitee keyword 420 that relates to the item and weight the vote based on a weight associated with the invitee keyword.

In some situations, a user may prefer to avoid disclosure of information related to an interest of the user under any circumstance/context. The user's preference for non-disclosure (private) may be based on a desire to avoid receiving items associated with the interest as gifts (e.g., groceries, toiletries, pharmaceuticals), and/or to avoid discomfort, embarrassment, and/or adverse impact on a relationship. Conversely, the user may prefer disclosure of information related to another interest of the user without any contextual limitation (public).

In an embodiment, system 400 is configured to permit a user to selectively designate user information as private, public, or contextual. Designations may be made on an interest-based level (i.e., keywords), and/or at an item level. Examples are provided below with reference to FIG. 5.

Figure 5:
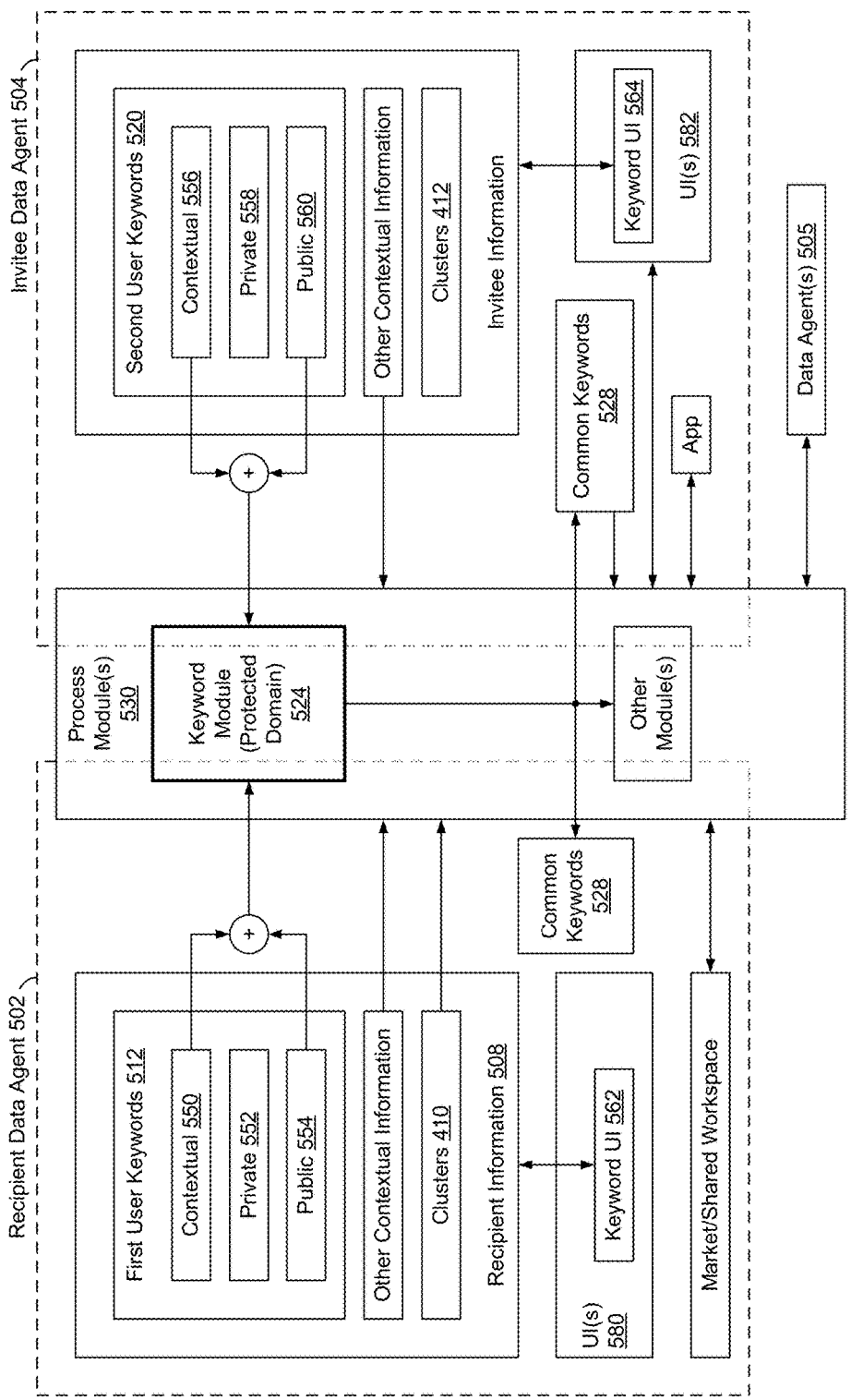
FIG. 5 is a block diagram of a system to disclose information of a first user within private workspaces of other users and to provide a shared workspace or market to permit subsets of the other users to collaborate with one another, based on contexts or contextual relations associated with the respective users.

FIG. 5 is a block diagram of a system 500 to contextually disclose information of a first user with one or more other users, and to permit subsets of the other users to collaborate with one another with respect to portions of the disclosed information based on contextual relations and user-assigned privacy designations.

System 500 includes a recipient data agent 502, invitee data agents 504 and 505, and one or more process modules 530, such as described above with respect to FIG. 4.

Data agents 502 and 504 include respective keyword UIs 562 and 564 to permit the users to designate keywords 512 and 520 of the respective users, and/or items of interests to the respective users, as private, public, or contextual.

Process modules 530 include a keyword module 524 to determine a set of one or more common keywords 528.

In an embodiment, keyword module 524 is configured to determine common keyword(s) 528 based on a comparison of recipient contextual keywords 550 and invitee contextual keywords 556, and to add public recipient public keywords 554 to common keyword(s) 528. In this example, information is disclosed to invitee data agent 504 if it relates to a shared interest and/or a public interest of the recipient. In this example, information may be disclosed to the invitee even if it relates to an interest that is designated private by the invitee.

In another embodiment, illustrated in FIG. 5, keyword module 524 is configured to compare a combined set of recipient contextual keywords 550 and recipient public keywords 554, to a combined set of invitee contextual keywords 556 and invitee public keywords 560. In this example, information is not disclosed to invitee data agent 504 if it relates to an interest that is designated private the recipient and/or the invitee. This embodiment effectively permits a user to limit the scope of information disclosed to other users, and the scope of information disclosed to the user by other users.

A system as described herein may be configured to present a graphical user interface on a display or monitor, which may serve as personal cloud UI, and which may include a tabbed browser GUI. Examples are provided below with reference to FIGS. 6, 7, and 8. A personal cloud UI is not, however, limited to the examples of FIG. 6, 7, or 8.

Figure 6:
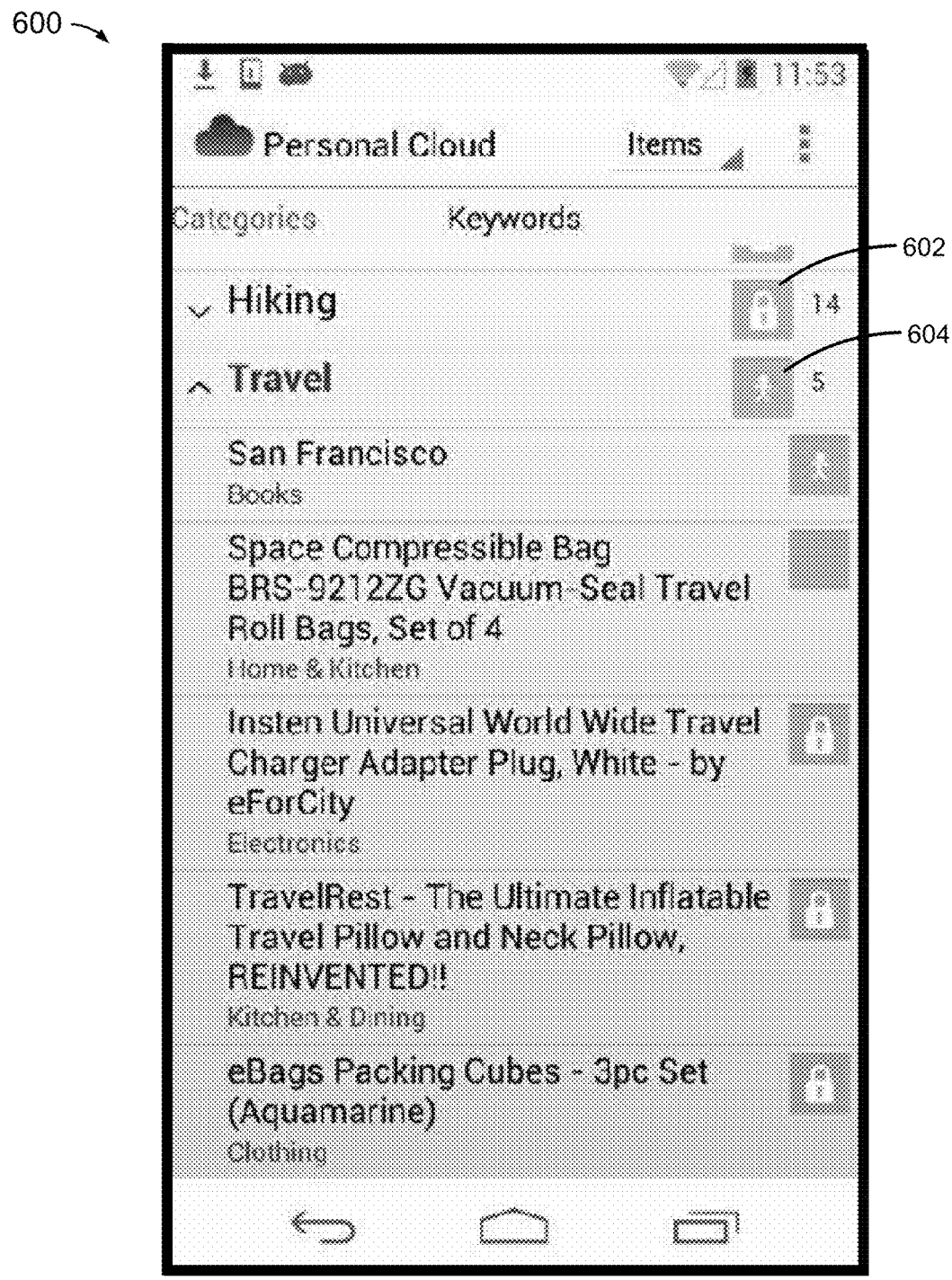
FIG. 6 is an image of a keyword user interface (UI) to display interests of a user (e.g., topics/subjects).

FIG. 6 is an image of a keyword UI 600 to display interests of a user (e.g., topics/subjects). Keyword UI 600 may correspond to keyword UI 562 or 564 in FIG. 5. Keyword UI 600 includes tabs corresponding to user interests. The tabs may be labeled with keywords of a respective user (e.g., keywords 512 or 520 in FIG. 5). In the example of FIG. 6, the tabs are labeled "hiking" and "travel."

The tabs include user-configurable security designation boxes 602 and 604 to permit the user to designate the corresponding interest as public, private, or contextual.

Keyword UI 600 may be configured to present a pull-down list of the user-selectable security designations when the security designation box is selected (e.g., clicked or tapped). Alternatively, keyword UI 600 may be configured to toggle through user-selectable designations with each click or tap of a security designation box.

A user-selected security designation may be represented with a corresponding image or icon, such as lock icon for private, and a stick figure for public.

The number "14" in the hiking tab indicates that 14 items of interest to the user are associated with hiking. The number "5" in the travel tab indicates that 5 items of interest to the user are associated with travel. In FIG. 6, the travel tab is expanded to display 5 sub-tabs corresponding to the 5 items of interest to the user. Each of the 5 sub-tabs includes a corresponding security designation box to permit the user to assign a security designation to an item, to override any security designation assigned to the user interest or keyword.

Figure 7:
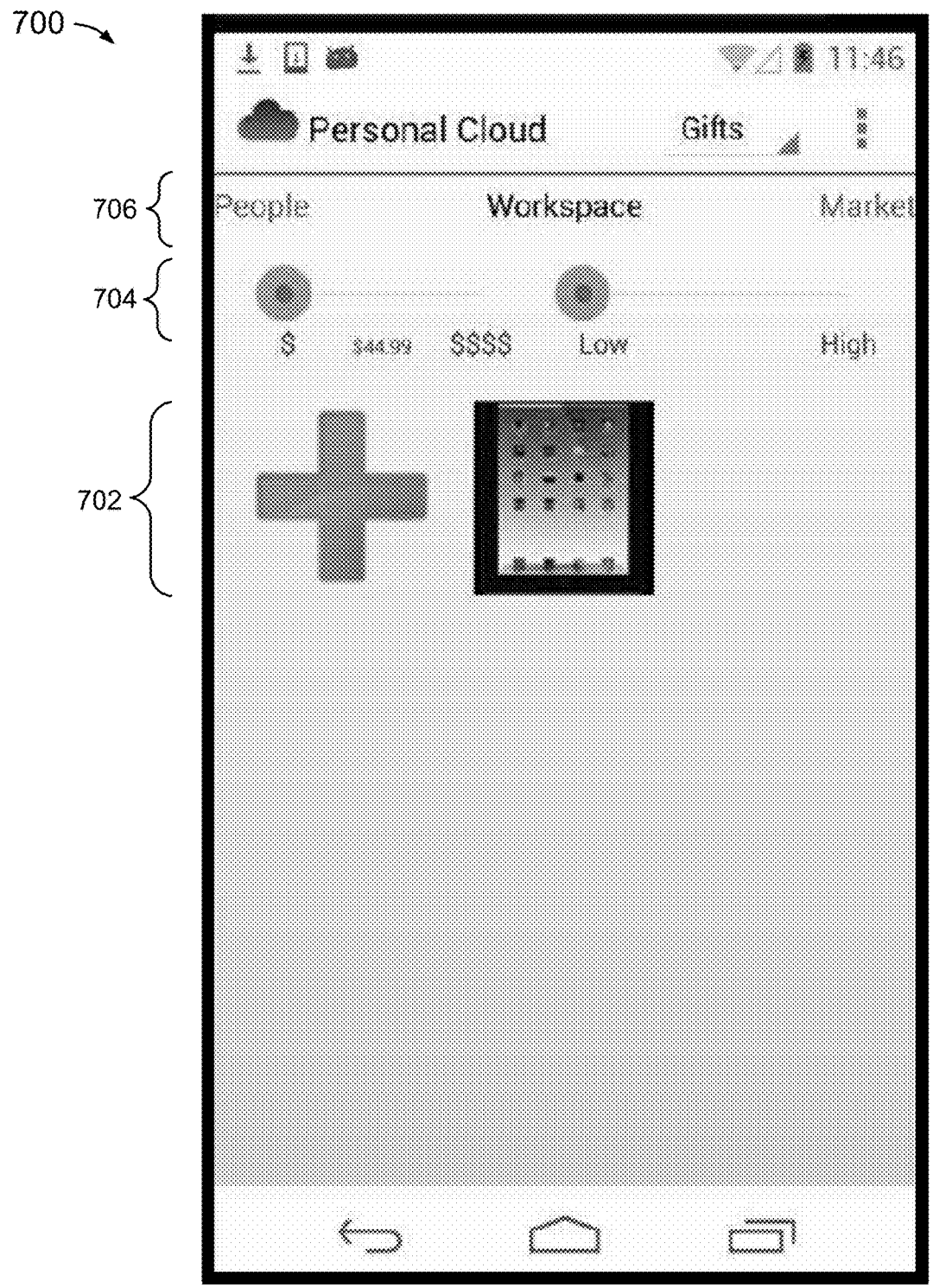
FIG. 7 is an image of a private workspace UI.

FIG. 7 is an image of a workspace UI 700, which may correspond to workspace UI 442 in FIG. 4.

Workspace UI 700 includes items 702 (i.e., icons, images, or other representations of items). Items 702 may correspond to contents 440 of workspace 441 in FIG. 4.

Workspace UI 700 further includes slider controls 704, having slider controls to permit the user to configure filters, such as described in one or more examples herein.

Figure 8:
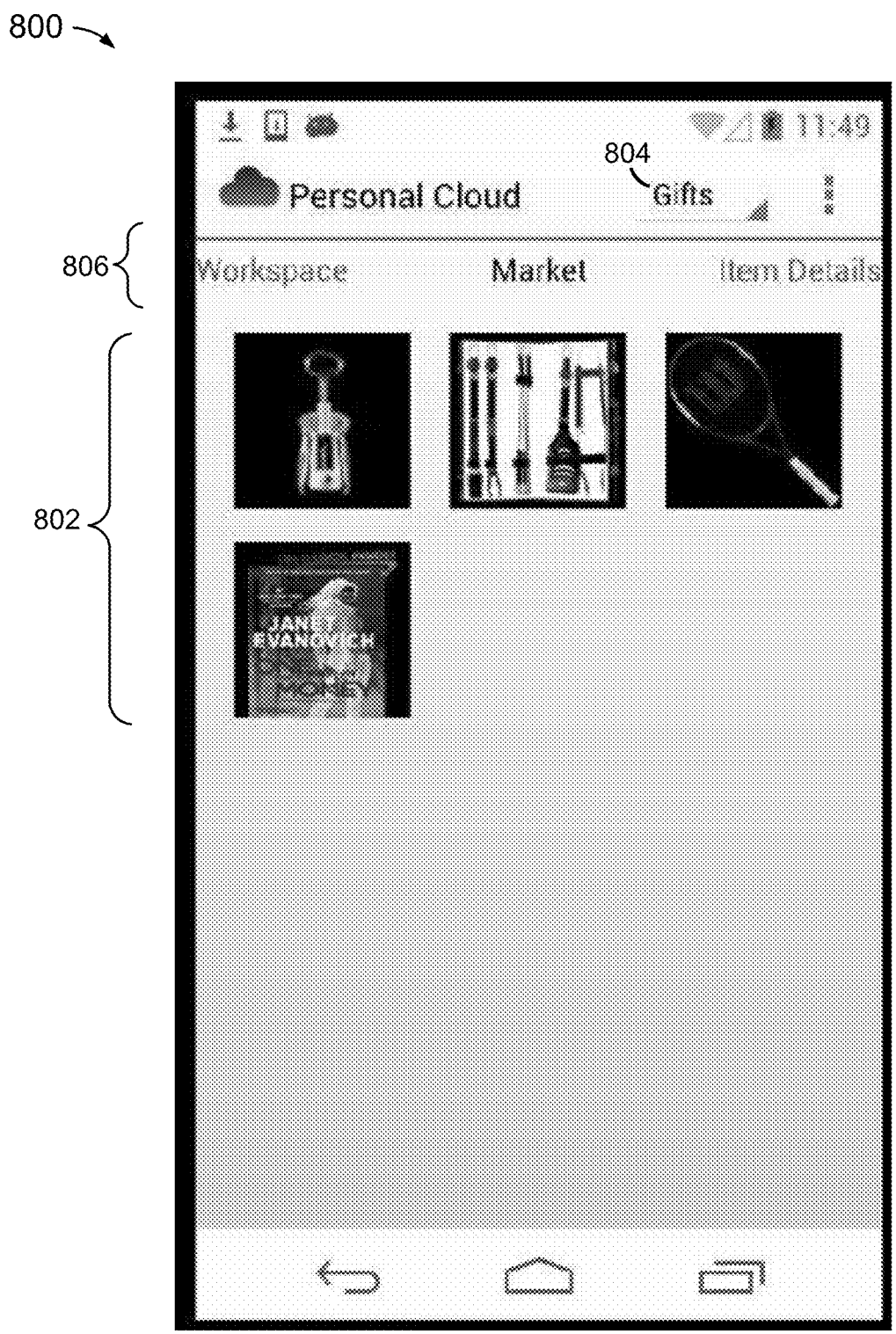
FIG. 8 is an image of a market UI.

FIG. 8 is an image of a market UI 800 to display selected items/information 802 of a market, such as described in one or more examples herein. Contextual market UI 800 may correspond to contextual market UI 448 in FIG. 4.

Contextual market UI 800 includes a user-selectable "Gifts" icon 804 to present user-selectable gift options, such as described in one or more examples herein.

In FIGS. 7 and 8, UIs 700 and 800 further include respective toolbars 706 and 806 to permit a user to switch amongst multiple UIs. Toolbars 706 and 806 may be configured to scroll amongst multiple UIs in response to a touch, swipe, or other motion. Toolbars 706 and 806 may represent respective views of the same toolbar. Toolbar 706 is controllable to display a people UI, workspace UI 700, and a market UI (e.g., market UI 800). Toolbar 806 is controllable to display a workspace UI (e.g., workspace UI 700), market UI 800, and an items detail UI.

Figure 9:
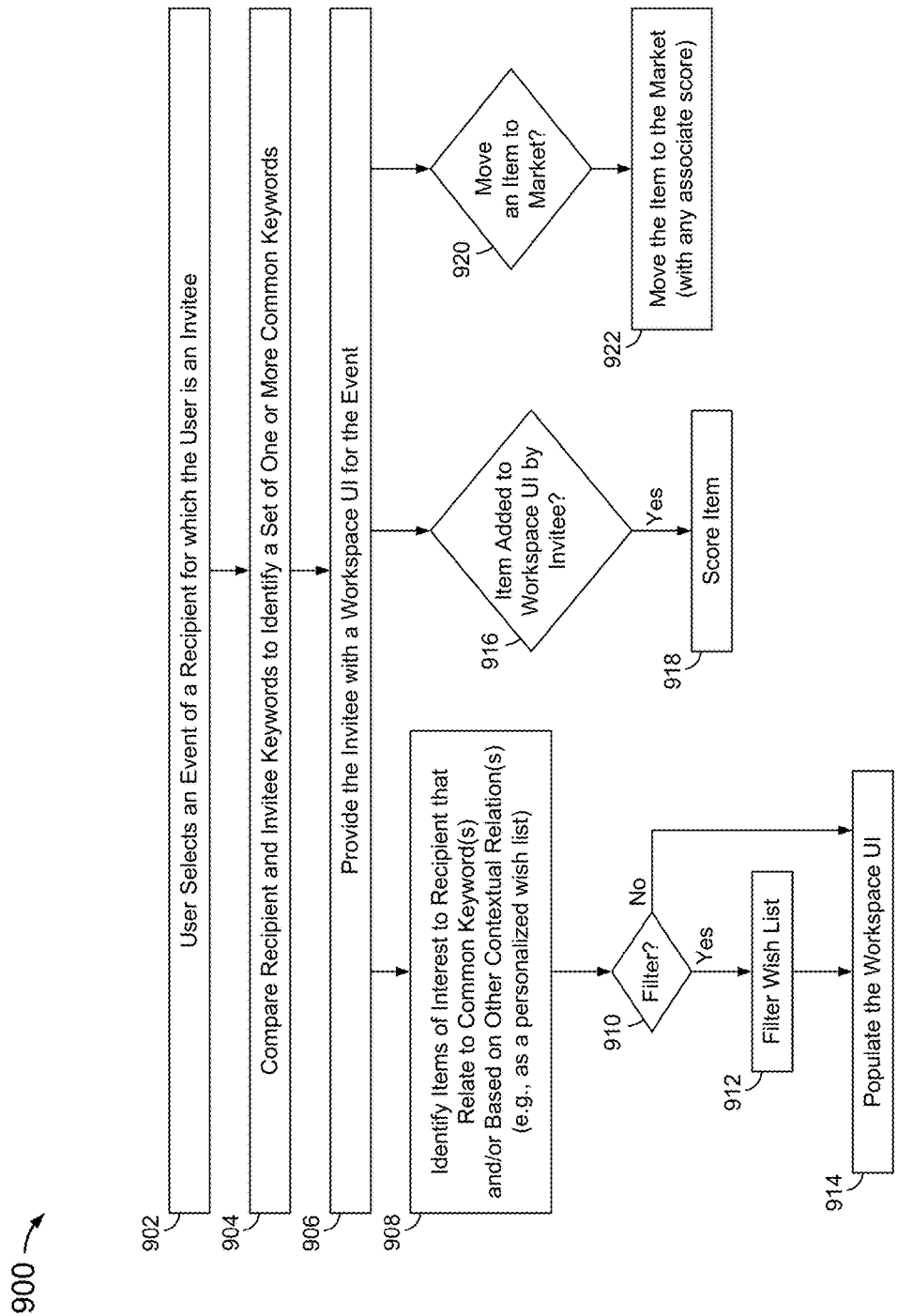
FIG. 9 is a flowchart of a method of managing a private workspace based on context.

FIG. 9 is a flowchart of a method 900 of managing a workspace (e.g., workspace 482 in FIG. 4) based on context.

At 902, a user selects an event of a recipient for which the user is an invitee.

At 904, keywords of the recipient and the invitee are compared to identify a set of one or more common keywords.

At 906, the invitee is provided a workspace UI for the event, such as workspace UI 442 in FIG. 4.

At 908, items of interest to the recipient that relate to a common keyword are identified. The identified items may serve as a personalized wish list of items of interest to the recipient. Additional items of interest to the recipient may be identified based on other contextual relation(s).

At 910, if the items identified at 908 are to be filtered, processing proceeds to 912, where the items identified at 908 are filtering based on one or more pre-determined and/or user-configurable criteria.

At 914, the workspace UI is populated with items identified at 908 or results of the filtering at 912.

At 916, if an item is added to the workspace UI by the invitee (e.g., from a source other than information of the recipient), the item may be scored at 918, such as described above with respect to score module 434 in FIG. 4.

At 920, if the invitee elects to move an item from the workspace UI to a market associated with the event, the item is moved to the market at 922, such as described above with respect to market 446 in FIG. 4. As described above with respect to FIG. 4, the item may be selectively moved to the market based on a score associated with the item and/or other factor(s).

Method 900 may be performed with respect to each of multiple invitees of an event.

Figure 10:
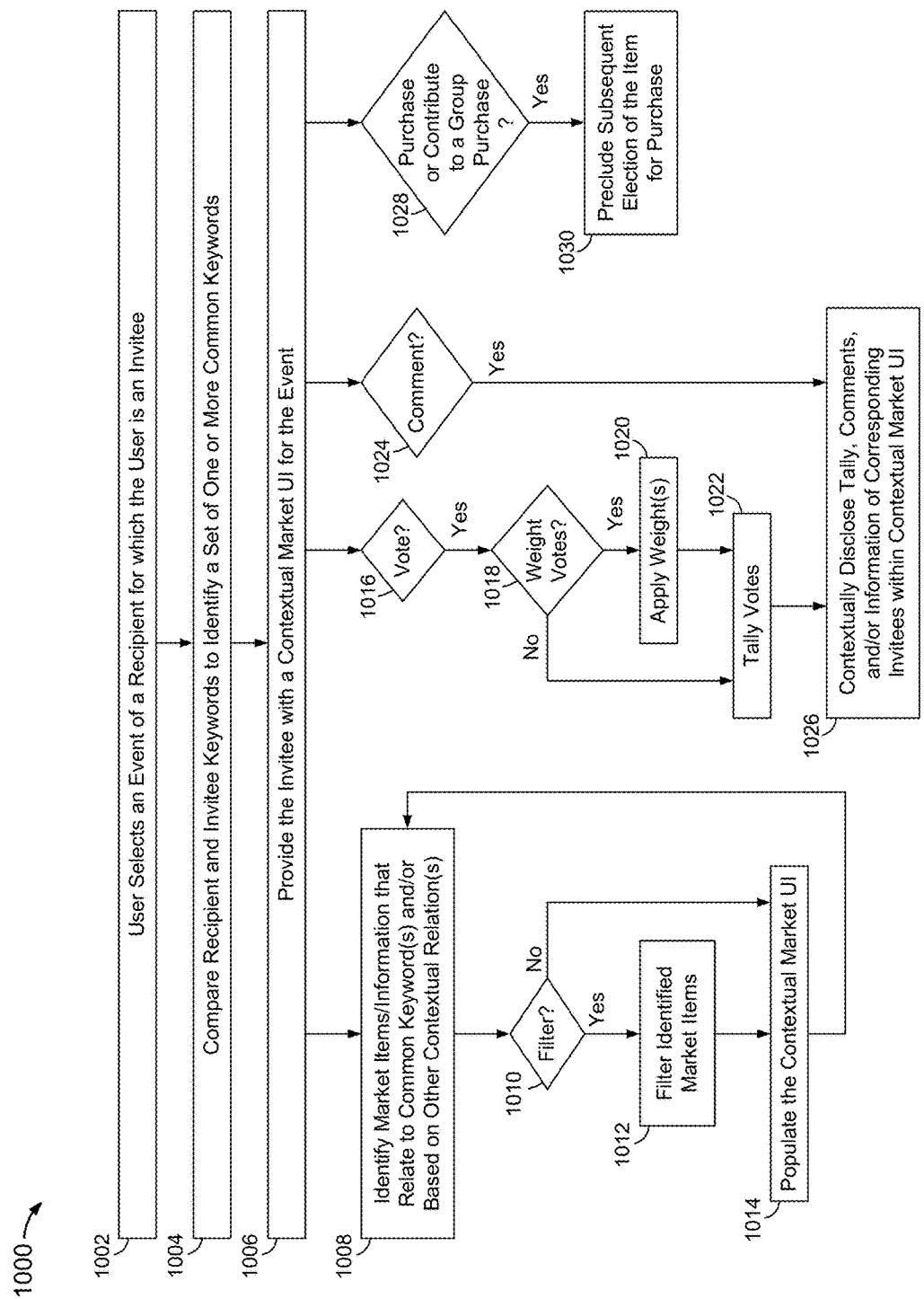
FIG. 10 is a flowchart of a method of managing a shared workspace or market, such as to permit invitees to crowd-source potential gifts of interest to a recipient.

FIG. 10 is a flowchart of a method 1000 of managing a shared workspace or market (e.g., market 446 in FIG. 4), such as to permit invitees to crowd-source potential gifts of interest to a recipient.

The market may be populated with items by one or more invitees, such as described above with respect to method 900. Method 1000 is not, however, limited to the example of method 900.

At 1002, a user selects an event of a recipient for which the user is an invitee, where the event is associated with the market.

At 1004, keywords of the recipient and the invitee are compared to identify a set of one or more common keywords.

At 1006, the invitee is provided a contextual market UI for the event, such as contextual market UI 448 in FIG. 4.

At 1008, items within the market that relate to a common keyword are identified. Additional market items may be identified based on other contextual relation(s).

At 1010, if the items identified at 1008 are to be filtered, processing proceeds to 1012, where the items identified at 1008 are filtering based on one or more pre-determined and/or user-configurable criteria.

At 1014, the contextual market UI is populated with items identified at 1008 or results of the filtering at 1012.

1002 through 1014 may be performed with respect to each of multiple invitees.

At 1016, an invitee may submit a vote with respect to one or more items presented within the contextual market UI.

At 1018, if vote weighting is utilized, votes of multiple invitees are weighted at 1020, for each market item that receives votes.

At 1022, weighted or un-weighted votes are tallied for each market item that receives votes. The tally may serve as a measure of likely recipient interest in the item, such as described in one or more examples herein.

At 1024, an invitee may submit comments with respect to one or more items presented within the contextual market UI, and/or with respect to comments of other invitees presented within the contextual market UI.

At 1026, vote tallies, comments of invitees, and/or information of the respective invitees are disclosed or shared amongst the invitees based on contextual relation information of the respective invitees, such as to assist the invitees in choosing a gift(s) for the recipient.

At 1028, an invitee may purchase or elect to purchase a market item for the recipient, and/or a group of invitees may elect to participate in crowd-sourced purchases of a market item as a gift to the recipient, such as described in one or more examples herein.

At 1030, the elected or purchased market item is precluded from subsequent election/purchase, such as described in one or more examples herein.

Each of methods 900 and 1000, and/or portions thereof, may be performed alone and/or in various combinations with one another.

An example is provided below with references to methods 900 and 1000. The example is based on a recipient and invites for which:

the recipient and a first invitee share an interest in tennis;
the recipient is interested in obtaining a new tennis racquet;

the first invitee is a former professional tennis player;
a second invitee does not have an interest in tennis, but has a close personal friendship with the recipient; and
a third invitee has in interest in tennis (e.g., a spectator or novice/recreational tennis player), but has less experience and/or knowledge of tennis relative to the first invitee.

At 916 in FIG. 9, the first invitee identifies a particular tennis racquet (e.g., manufacturer/model), adds it to the workspace of the first invitee. The first invitee may identify the tennis racquet by scanning a barcode of the tennis racquet at a store and/or selecting the tennis racquet from within a browser.

At 918, the identified tennis racquet is scored.

At 920, the first invitee moves the tennis racquet from the workspace to the market for consideration by other invitees (e.g., to permit other invitees to vote at 1016 in FIG. 10, provide comments at 1024 in FIG. 10, to purchase and/or participate in a group-based purchase of the item at 1028 in FIG. 10).

At 1008-1014 in FIG. 10, the tennis racquet is presented within the contextual market UI of the third invitee based on the tennis interest of the third invitee, The score assigned to the tennis racquet at 922 and/or information of the first invitee (e.g., identity of the first invitee and/or fact that first invitee is a former professional tennis player), may also be presented within the contextual market UI of the third invitee.

The tennis racquet is also presented within the contextual market UI of the second invitee based on the personal friendship with the recipient (i.e., even if the second invitee does not have an interest in tennis). This may be useful to obtain user input based on knowledge gained through the friendship, which may be relevant to the recipient interest in the tennis racquet. For example, the recipient may have privately expressed a preference to the second invitee with respect to a particular brand, model, store, color, and/or other factor.

At 1016 and 1024, each invitee to whom the tennis racquet is disclosed may submit a vote and/or a comment with respect to the tennis racquet. A vote in favor of the tennis racquet may be generated automatically or inherently with respect to the first invitee as the submitter of the tennis racquet.

At 1018, a vote from the first recipient (i.e., a tennis expert), may be weighted based on the fact that the first invitee is a former tennis professional. The weight may be set at a level that would more than offset a vote against the tennis racquet by the third invitee, to account for the difference in experience and/or knowledge.

Also at 1018, a vote from the second invitee may be weighted based on the friendship with the recipient.

At 1022, the votes (weighted and/or un-weighted) are tallied.

At 1026 the vote tally, a score reflective of the vote tally, invitee comments, and/or information of the corresponding invitees is selectively disclosed amongst invitees based on respective contextual relations, such as to assist the invitees in choosing a gift(s) for the recipient at 1028.

Methods 900 and 1000 are not limited to the examples above.

Figure 11:
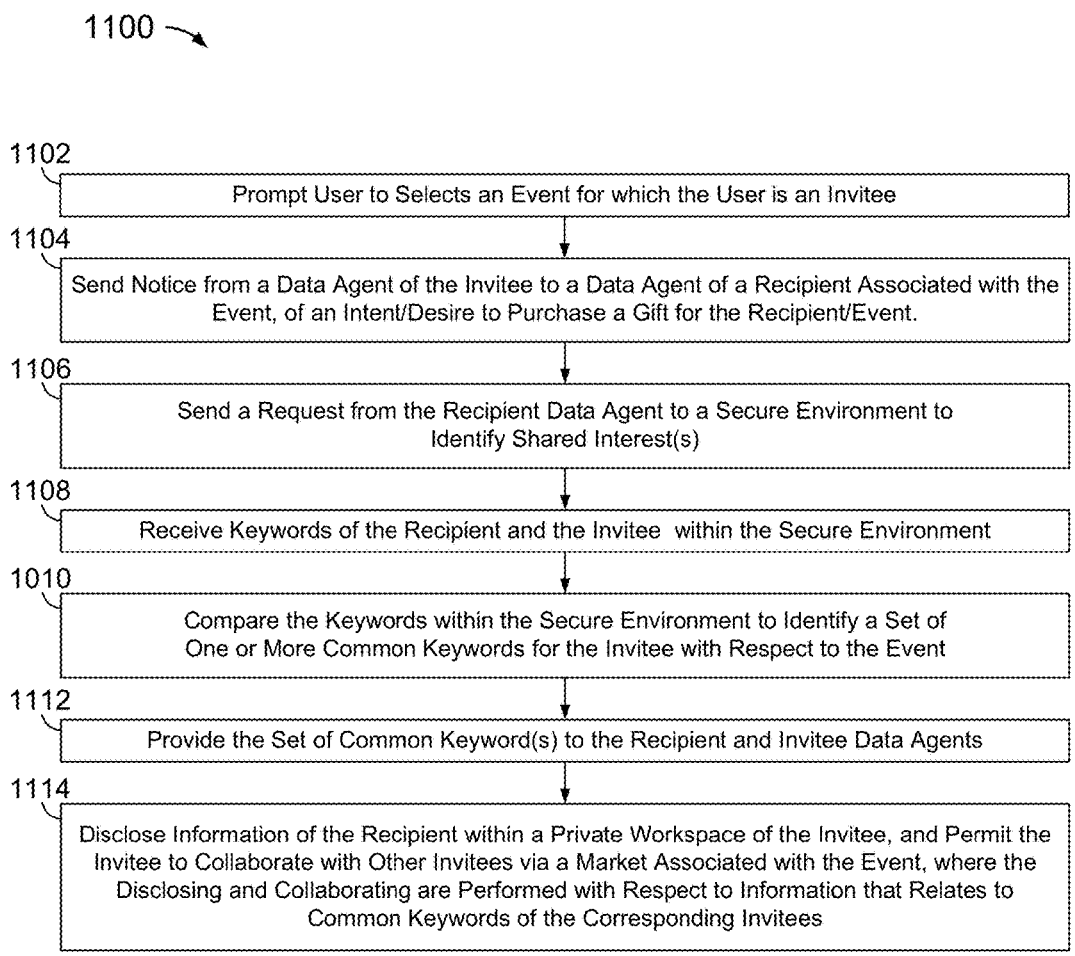
FIG. 11 is a flowchart of a method 1100 of initiating a session to contextually disclose information to an invitee of an event.

FIG. 11 is a flowchart of a method 1100 of initiating a session to contextually disclose information to an invitee of an event.

At 1102, the user is prompted to select an event for which the user in an invitee. The user may be presented with an event selection icon, selection of which presents the user with a list of user-selectable events to which the user is invited.

The event selection icon may be displayed within a UI of a crowd-sourced gift application or service, or within a UI of another application or service, such as a social network service. In the latter situation, selection of the event selection icon may re-direct to a crowd-sourced gift service UI. The crowd-sourced gift service may be hosted by the social network service, or independent of the social network service.

The list of events may be obtained from an electronic calendar associated with the user and/or from another application or service, such as electronic messages and/or a social networking account of the user.

At 1104, upon selection of an event at 1102, notice is sent from a data agent of the user/invitee to a data agent of a user/recipient associated with the event. The notice may serve as, or include a notice of intent or desire to buy a gift for the recipient/event.

At 1106, the recipient data agent sends a request to a secure environment to identify contextual relation information (e.g., common interests) of the recipient and invitee.

At 1108, keywords of the recipient and keywords of the invitee are received within the secure environment. The keywords may include keywords designated public and/or contextual. The keywords may be viewable to the corresponding users, or only used to issue the queries by the system.

At 1110, the keywords are compared within the secure environment to identify a set of one or more common keywords.

At 1112, the common keyword(s) are provided to the recipient data agent and to the invitee data agent. The common keyword(s) may be viewable to the recipient and/or the invitee. Alternatively, the common keyword(s) may be hidden from the recipient and/or the invitee and used only internally by the corresponding data agents.

At 1114, the recipient data agent handles queries from the invitee data agent (and from data agents of other invitees), such as described in one or more examples herein.

Method 1100 and/or portions thereof may be performed alone and/or in various combinations with features of method 900 and/or method 1000.

Methods and systems disclosed herein may facilitate social interactions amongst people who might not know each other, and/or create alliances and communities that come together around an event. For example, an inquiry 450 in FIG. 4 may be directed to multiple users (i.e., a general query), such as to find users having a particular interest, such an entertainer or performer.

One or more security features may be provided to guard against unintended use, undesired use, and/or misuse (collectively referred to herein as misuse). Examples of misuse and corresponding security features are disclosed below. Security features are not limited to the examples below.

Misuse use may include a requester submitting numerous queries and/or requests for recommendations with respect to information of a target, such as to expose an interest of the target that is not an interest of the requestor, and/or is designated private by the target. To counter such misuse, requestors may be permitted a limited number of queries. The limit may be based in part on evidence of a relationship between the requestor and a target. Relationship evidence may include evidence of a purported interest of the requestor. Relationship evidence may include evidence of a social relationship between the requestor and the target, which may be obtained through a social networking account of the requestor and/or target, and/or which may be based on interactions between the requestor and the target, invitations directed to both the requestor and the target, and/or other factor(s).

As another example, misuse may include a user taking actions to increase the number and/or scope of interests associated with the user, in an attempt to increase the number and/or scope of common keywords and thus expose interests of other users beyond what would otherwise be disclosed. To counter such misuses, usage may be monitored relative to a threshold and/or a pattern. A security procedure may be invoked, for example, if a number of common keywords exceed a threshold. Another technique to counter such misuse, is to monitor electronic records to confirm or repudiate a self-reported purchase. Repudiation may preclude expansion of existing interest/keywords of the user. This may preclude purchase-based expansion of interests/keywords except where the user actually purchases items. Purchasing of items to unduly expand interests/keywords may be prohibitively expensive, at least with respect to relatively expensive items.

One or more features disclosed herein may be implemented in, without limitation, circuitry, a machine, a computer system, a processor and memory, a computer program encoded within a computer-readable medium, and/or combinations thereof. Circuitry may include discrete and/or integrated circuitry, application specific integrated circuitry (ASIC), a system-on-a-chip (SOC), and combinations thereof. Information processing by software may be concretely realized by using hardware resources.

Figure 12:
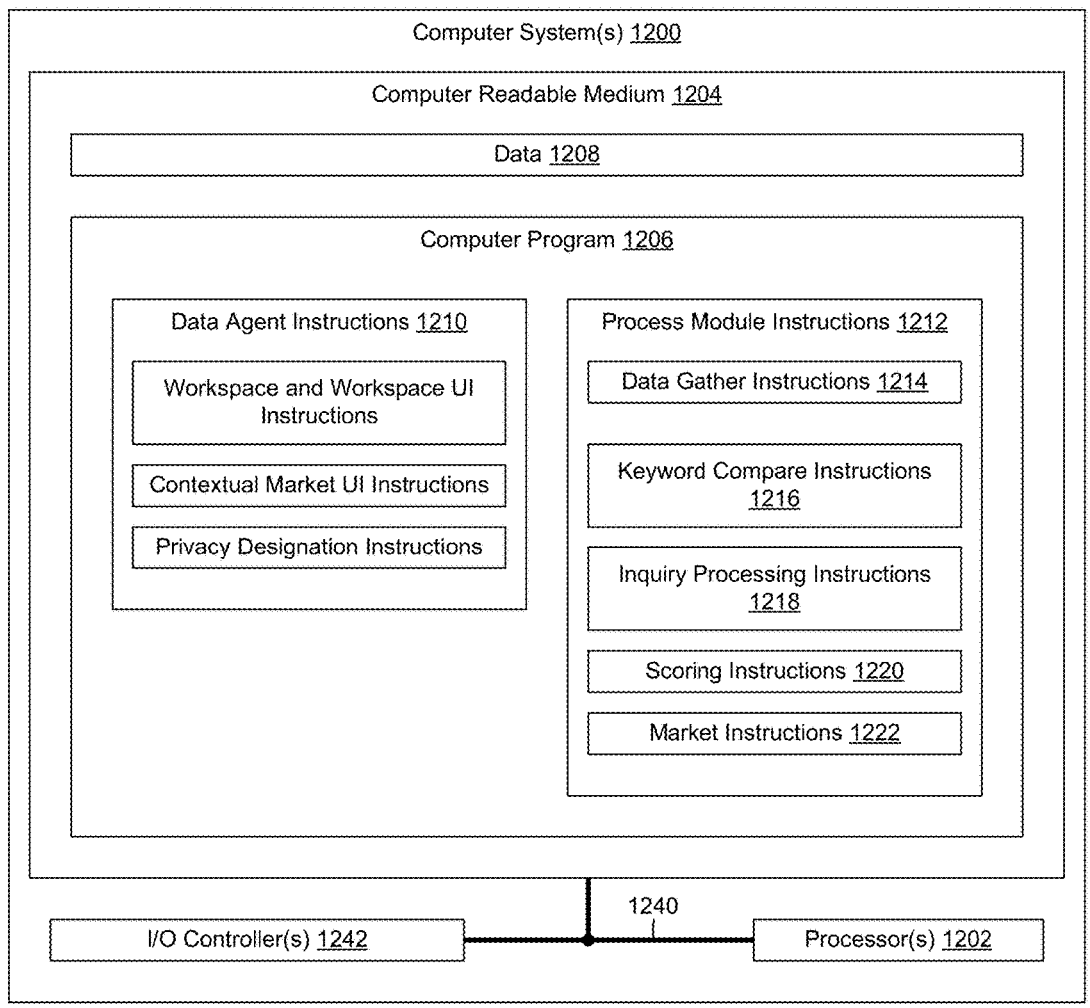
FIG. 12 is a block diagram of a computer system configured to contextually disclose information of a first user to one or more other users and to permit subsets of the other users to collaborate with one, based on context or contextual relations.

FIG. 12 is a block diagram of a computer system 1200 configured to disclose information of a first user to one or more other users and to permit subsets of the other users to collaborate with one another with respect to portions of the disclosed information, based on context or contextual relations. Computer system 1200 may represent a user device, a cloud server, and/or combinations thereof.

Computer system 1200 includes one or more processors, illustrated here as a processor 1202, to execute instructions of a computer program 1206 encoded within a computer-readable medium 1204. Computer readable medium 1004 further includes data 1208 to be used by a processor 1202 during execution of computer program 1206 and/or generated by a processor 1202 during execution of computer program 1206.

Processor 1202 may include one or more instruction processors and/or processor cores, and a control unit to interface between the instruction processor(s)/core(s) and computer readable medium 1204. Processor 1202 may include, without limitation, a microprocessor, a graphics processor, a physics processor, a digital signal processor, a network processor, a front-end communications processor, a co-processor, a management engine (ME), a controller or microcontroller, a central processing unit (CPU), a general purpose instruction processor, and/or an application-specific processor.

Medium 1204 may include a transitory or non-transitory computer-readable medium, and may include one or more types of media disclosed below with reference to FIG. 13. Computer-readable medium 1204 is not, however, limited to the examples of FIG. 13.

Figure 13:
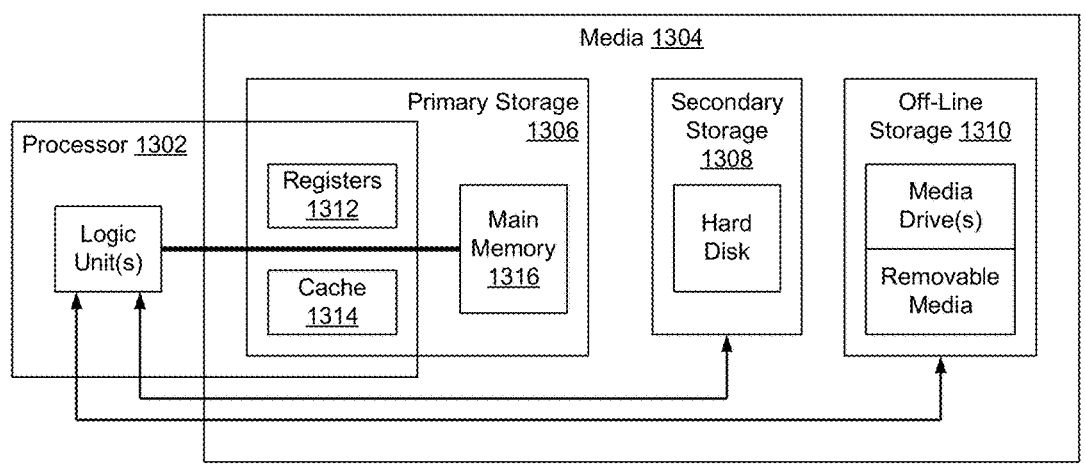
FIG. 13 is a block diagram of example computer-readable media of the computer system of FIG. 12.

FIG. 13 is a block diagram of a processor 1302 and computer-readable media 1304. In FIG. 13, media 1304 includes primary storage 1306, secondary storage 1308, and off-line storage 1310.

Primary storage 1306 includes registers 1312, processor cache 1314, and main memory or system memory 1316. Registers 1312 and cache 1314 may be directly accessible by processor 1302. Main memory 1316 may be accessible to processor 1302 directly and/or indirectly through a memory bus. Primary storage 1306 may include volatile memory such as random-access memory (RAM) and variations thereof including, without limitation, static RAM (SRAM) and/or dynamic RAM (DRAM).

Secondary storage 1308 may be indirectly accessible to processor 1302 through an input/output (I/O) channel, and may include non-volatile memory such as read-only memory (ROM) and variations thereof including, without limitation, programmable ROM (PROM), erasable PROM (EPROM), and electrically erasable PROM (EEPROM). Non-volatile memory may also include non-volatile RAM (NVRAM) such as flash memory. Secondary storage 1308 may be configured as a mass storage device, such as a hard disk or hard drive, a flash memory drive, stick, or key, a floppy disk, and/or a zip drive.

Off-line storage 1310 may include a physical device driver and an associated removable storage medium, such as an optical disc.

In FIG. 12, computer program 1206 includes data agent instructions 1210 to cause processor 1202 to perform recipient data agent functions and invitee data agent functions on behalf of a user, such as described above with respect to one or more of data agents 402 and 404 in FIG. 4, and 502 and 504 in FIG. 5.

Computer program 1206 further includes process module instructions 1212 to cause processor 1202 to perform one or more processes such as described above with respect to one or more of process modules 430 and/or 530 in FIGS. 4 and 5.

Process module instructions 1212 may include data gather instructions 1214 to cause processor 1202 to gather information, extract information of the user from the gathered information, identify items of interest to the user from the extracted information, cluster the times of interest, and assign keywords to the clusters, such as described above with respect to FIGS. 1 and 2.

Process module instructions 1212 may include keyword compare instructions 1216 to cause processor 1202 to compare keywords of multiple users, such as described with respect to keyword module 424 in FIG. 4 and/or keyword module 524 in FIG. 5.

Process module instructions 1212 may include inquiry-processing instructions 1218 to cause processor 1202 to process inquiries from other data agents, such as described above with respect to inquiry module 432 in FIG. 4.

Process module instructions 1212 may include scoring instructions 1220 to cause processor 1202 to score items added to a workspace of the user, such as described above with respect to score module 434 in FIG. 4.

Process module instructions 1212 may include market instructions 1222 to cause processor 1202 to manage a market associated with an event of the user, such as described above with respect to market module 436 in FIG. 4.

Computer system 1200 may be configured to represent an item as or with a data object, and to populate the data object with descriptive information, such as item name and item descriptors. The data object may be populated with other information such as, without limitation, vendor or manufacturer information, pricing information, and/or availability information. If the item is added to a workspace by a user (e.g., by scanning), computer system 1200 may be configured to further populate the data object with the score. The data object may be further populated with information generated through market collaboration amongst invitees, such as a vote tally, a score based on the vote tally, comments of invitees, and/or information of the respective invitees.

Computer system 1200 further includes communications infrastructure 1240 to communicate amongst devices and/or resources of computer system 1200.

Computer system 1200 further includes one or more input/output (I/O) devices and/or controllers 1242 to interface with one or more other systems, such as data source(s) 104 in FIG. 1, data source(s) 204 in FIG. 4, other user devices, and/or cloud server 332 in FIG. 3.

Methods and systems disclosed herein may be implemented with respect to one or more of a variety of systems and/or devices, an example of which is provided below with reference to FIG. 14. Methods and systems disclosed herein are not, however, limited to the examples of FIG. 14.

Figure 14:
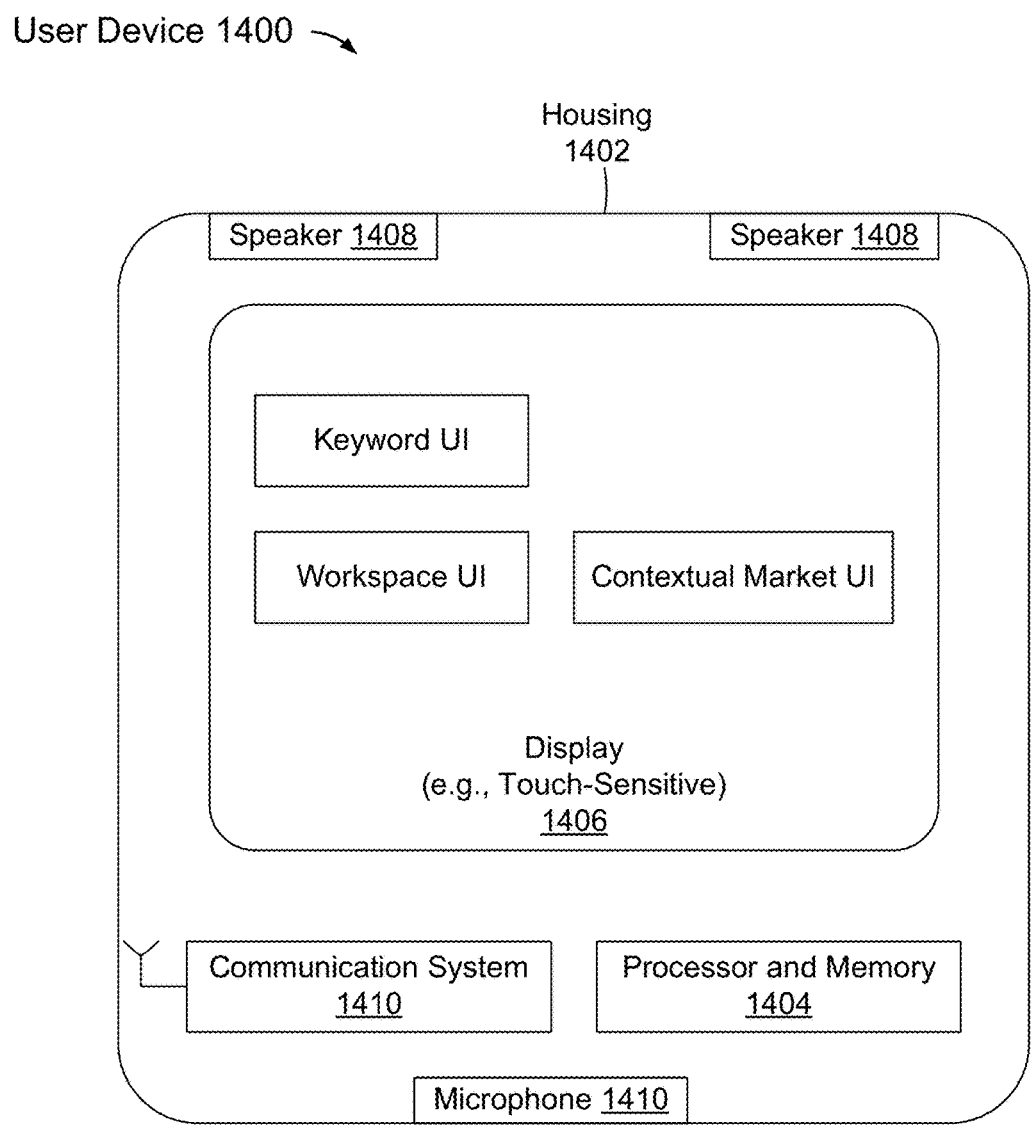
FIG. 14 is a depiction of a user device to interface with one or more other user devices and/or a cloud server, and to render a keyword UI, a workspace UI, and/or a contextual market UI on a display.

FIG. 14 is a depiction of a user device 1400 to interface with one or more other user devices and/or a cloud server.

User device 1400 includes a housing 1402 to house a processor and memory 1404, which may include, without limitation, memory, cache, and/or other computer-readable medium. Processor and memory 1404 may be configured with respect to one or more features described above with reference to FIG. 12 and/or FIG. 13.

User device 1400 further includes one or more HIDs. In FIG. 14, user device 1400 includes a display 1406, speakers 1408, and a microphone 1410. User device 1400 may include a physical keyboard with touch-sensitive and/or mechanically depressible keys. Where display 1406 includes a touch-sensitive display, processor and memory 1404 may be configured to render an image of a keyboard (i.e., a virtual keyboard) to display 1406.

Processor and memory 1404 may be configured to render a keyword UI, a workspace UI, and/or a contextual market UI to display 1406, such as described in one or more examples herein.

User device 1400 further includes a wireless communication system 1410 to communicate with one or more other devices or systems (e.g., other user devices and/or a cloud server), over a communication network, which may include a packet-based network (e.g., a proprietary network and/or the Internet), and/or a voice network (e.g., a wireless telephone network).

User device 1400 may be configured as a portable/handheld device, such as a mobile telephone or smart-phone and/or a computer system such as a laptop, notebook, net-book, note-pad, and/or tablet or pad system, and/or other conventional and/or future-developed user device. User device 1400 may also be configured as a stationary device, such as desktop computer, a set-top box, and/or a gaming device. User device 1400 is not, however, limited to these examples.

Figure 15:
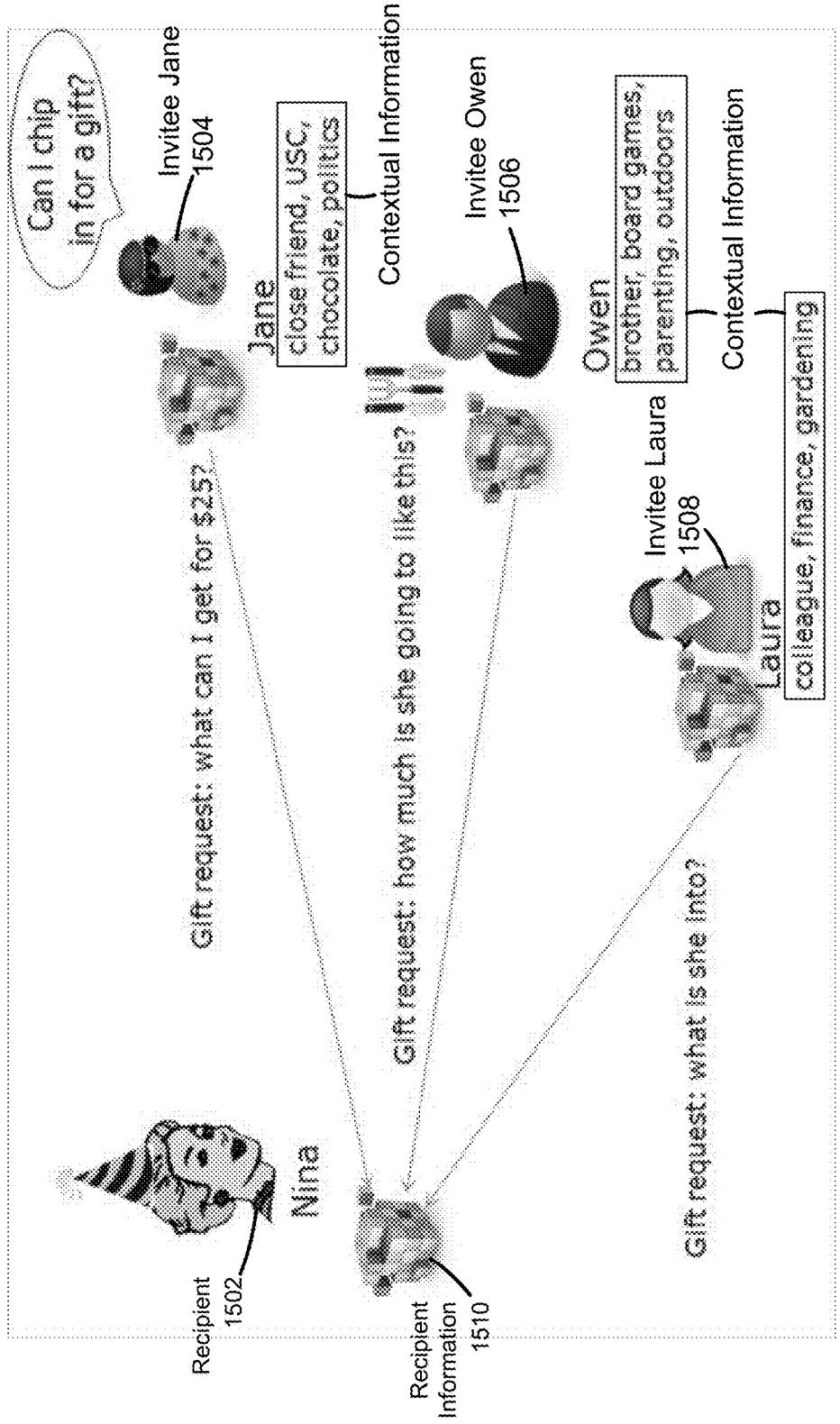
FIG. 15 is a depiction of a crowd-sourced gifting application, illustrating example or potential usages of a crowd-sourced gifting application.

FIG. 15 is a depiction of a crowd-sourced gifting application 1500, illustrating example or potential usages of a crowd-sourced gifting application. In FIG. 15, a user Nina 1502 is a recipient with respect to a gift-giving event, and users Jane 1504, Owen 1506, and Laura 1508 are invitees to the event.

In the example of FIG. 15, invitees Jane, Owen, and Laura pose respective inquiries 1510, 1512, and 1514, through their respective data agents, to a data agent of recipient Nina 1502.

Further in the example of FIG. 15, Jane requests disclosure of items of interest to Nina that do not exceed $25 (i.e., a personalized wish list of items of interest to Nina that do not exceed $25). Owen requests a score indicative of a likelihood that Nina is interested in an item identified by Owen, such as described above with respect to item 454 and score 456 in FIG. 4.

Invitee Laura 1508 requests disclosure of topics of interest to recipient Nina 1502. The data agent of Nina is configured to respond to each of inquiries 1510, 1512, and 1514, based on context, contextual information, and/or contextual relations between Nina and each of the other users, using different modalities depending upon the type of context, contextual information, and/or contextual relation.

EXAMPLES

The following examples pertain to further embodiments.

An Example 1 is a machine-implemented method of selectively disclosing information based on a contextual relation, including: accessing and extracting information from one or more of a user device, a computer-accessible user account, and electronic purchase records of a user; identifying items of interest to the user based on the extracted information; retrieving descriptive information regarding the items; clustering the items based on similarities/dissimilarities amongst the items; assigning descriptive keywords to the clusters, wherein the keywords represent subjects of interest to the user; comparing keywords of a first user with keywords of a second user to identify a set of one or more common keywords, wherein each keyword represents a subject of interest to the respective user, and wherein each common keyword represents a shared subject of interest of the first and second user; identifying a subset of items of interest to the first user based on the set of one or more common keywords; and disclosing the subset to the second user as a wish list of items interest to the first user that is tailored based on the shared subjects of interest of the first and second users.

In an Example 2, the method further includes weighting a user keyword based on one or more of a measure of user expertise with respect to the corresponding subject and a degree of user interest in the subject, and including an item of interest to the first user within the subset if it relates to a common keyword and a weight associated with the corresponding keyword of the second user meets a threshold.

In an Example 3, the accessing and extracting includes accessing and extracting information from one or more of: a computer-readable shopping list; a computer browser; an electronic message account; a computer-accessible financial account; a computer-accessible user account with a vendor; and a computer-accessible user account with a social networking service.

In an Example 4, the comparing includes comparing the keywords of the first and second users in a domain that is inaccessible to the first and second users.

In an Example 5, the method further includes precluding disclosure of non-matching keywords to the first and second users.

In an Example 6, the identifying includes identifying the subset items of interest to the first user in a domain that is inaccessible to the first and second users.

In an Example 7, the method further includes: permitting each of the first and second users to assign one of multiple privacy designations to each keyword of the respective user, and permitting each of the first and second users to assign a privacy designation to an item of a cluster that differs from a privacy designation of the cluster.

In an Example 8, the privacy designations include a private designation to preclude disclosure under any circumstance and a contextual designation to permit selective disclosure of based on a contextual relation, and the method further includes precluding inclusion of private-designated keywords of the first and second user within the set of one or more common keywords; and precluding disclosure of an item of interest to a user if the item is designated private.

In an Example 9, the privacy designations further include a public designation to permit disclosure without contextual relation constraint, and the comparing includes: comparing a combined set of public-designated and contextual-designated keywords of the first user to a combined set of public-designated and contextual-designated keywords of the second user to identify the set of one or more common keywords.

In an Example 10, the method of Example 9 further includes: selectively disclosing contextual-designated keywords of a user to another user based on contextual relations with the other user; and disclosing public-designated keywords of a user to another user without contextual relation constraint.

An Example 11 is a machine-implemented method of selectively disclosing information based on a contextual relation, including: selecting a subset of items of interest to a first user based on a contextual relation between the first user and a second user; disclosing the subset of items within a workspace of the second user as a wish list of items of interest the first user that is tailored based on the contextual relation; providing a computer-based market to receive items from the workspace of the second user and from workspaces of one or more other users, and to select a subset of market items based on the contextual relation between the first and second users; providing a workspace user interface (UI) to permit the second user to view contents of the workspace and to permit the second user to move items from the workspace to the market; and providing a contextual market UI to permit the second user to view the subset of market items, submit input regarding the subset of market items, and elect to contribute toward a crowd-based purchase of an item within the subset of market items as a gift to the recipient.

In an Example 12, the selecting of Example 11 includes: identifying shared subjects of interest of the first and second users; identifying items of interest to the first user that relate to the shared interests; and including the identified items within the subset of items of interest to the first user.

In an Example 13, the selecting of Example 11 or Example 12 includes: determining a nature of a social relationship between the first and second users; identifying items of interest to the first user based on the nature of the social relationship; and including the identified items within the subset of items of interest to the first user.

In an Example 14, the selecting and the disclosing of Example 11 are performed in accordance with any one of Examples 1-9.

In an Example 15, the method of Example 11 further includes permitting the second user to vote on items within the subset of market items, through the contextual market UI.

In an Example 16, the method of Example 15 further includes: tallying votes of multiple users and associate scores to market items based on respective vote tallies; and permitting the second user to view scores associated with the subset of market items, through the contextual market UI.

In an Example 17, method of Example 16 further includes weighting a vote of the second user based on contextual information of the second user.

In an Example 18, the weighting of Example 17 includes weighting the vote based on one or more of: a measure of expertise of the second user with respect to a subject matter of the vote; a measure of interest of the second user with respect to the subject matter of the vote; and a social relationship between the first and second users.

In an Example 19, the method of Example 15 further includes permitting the second user to view votes of other users directed to the subset of market items, and to view information of the respective other users, through the contextual market UI.

In an Example 20, the method of Example 11 further includes: permitting the second user to submit comments regarding items within the subset of market items, through the contextual market UI; and permitting the second user to view comments submitted by other users regarding items within the subset of market items, and to view information of the respective other users, through the contextual market UI.

In an Example 21, the method of Example 11 further includes permitting the second user to add an item to the workspace from a source other than the contextual relation contextual relation module, through the workspace UI.

In an Example 22, the method of Example claim 21 further includes assigning a score to the added item indicative of a likelihood that the added item is of interest to the first user.

In an Example 23, the assigning a score of Example 22 includes assigning the score based on one or more of: an extent to which the added item relates to an interest of the first user; an extent to which the added item relates to a shared interest of the first and second users; an extent to which the added item relates to an interest of the second user; a measure of expertise of the second user with respect to a subject matter of the added item; and a social relationship between the first and second users.

In an Example 24, The method of Example 11 further includes: precluding access to the market and to the workspaces of other users, by the first user prior to an event associated with the market; and permitting the first user to access one or more of the market and the workspaces of the users subsequent to the event.

In an Example 25, the method of claim 11 further includes: providing a market for each event of the respective user; and providing a workspace UI and a contextual market UI for each event for which the respective user is an invitee.

An Example 26 is a machine readable medium comprising a plurality of instructions that in response to being executed on a computing device, cause the computing device to carry out a method according to any one of Examples 1-25.

An Example 27 is a communications device arranged to perform the method of any one of claims 1-25.

An Example 28 is an apparatus to compute a device location, configured to perform the method of any one of Examples 1-25.

An Example 29 is a computer system to perform the method of any of Examples 1-25.

An Example 30 is a machine to perform the method of any of Examples 1-25.

An Example 31 is an apparatus comprising: means for performing the method of any one of Examples 1-25.

An Example 26 is a computing device that includes a chipset according to any one of Examples 1-25.

An Example 26 is a non-transitory computer-readable medium encoded with a computer program, including instructions to cause a processor to perform a method as recited in any one of Examples 1-25.

An Example 34 is a system to selectively disclose information based on a contextual relation, comprising: a data module to access and extract information from one or more of a user device, a computer-accessible user account, and electronic purchase records of a user, identify items of interest to the user based on the extracted information, retrieve descriptive information regarding the items, cluster the items based on similarities/dissimilarities amongst the items, and assign descriptive keywords to the clusters, wherein the keywords represent subjects of interest to the user; a keyword module to compare keywords of a first user with keywords of a second user to identify a set of one or more common keywords, wherein each keyword represents a subject of interest to the respective user, and wherein each common keyword represents a shared subject of interest of the first and second user; and a process module to identify a subset of items of interest to the first user based on the set of one or more common keywords, and to disclose the subset to the second user as a wish list of items interest to the first user that is tailored based on the shared subjects of interest of the first and second users.

In an Example 35, the data module is further configured to weight a user keyword based on one or more of a measure of user expertise with respect to the corresponding subject and a degree of user interest in the subject; and the process module is configured to include an item of interest to the first user within the subset if it relates to a common keyword and a weight associated with the corresponding keyword of the second user meets a threshold.

In an Example 36, the data module is configured to access and extract information from one or more of: a computer-readable shopping list; a computer browser; an electronic message account; a computer-accessible financial account; a computer-accessible user account with a vendor; and a computer-accessible user account with a social networking service.

In an Example 37, the keyword module is configured to compare the keywords of the first and second users in a domain that is inaccessible to the first and second users.

In an Example 38, the keyword module is configured to preclude disclosure of non-matching keywords to the first and second users.

In an Example 39, the process module is configured to identify the subset items of interest to the first user in a domain that is inaccessible to the first and second users.

In an Example 40, the system further includes first and second keyword user interfaces (UIs), each to permit a respective one of the first and second users to assign one of multiple privacy designations to each keyword of the user, and to permit the respective user to assign a privacy designation to an item of a cluster that differs from a privacy designation of the cluster.

In an Example 41: the keyword UIs include a private designation to preclude disclosure under any circumstance, and a contextual designation to permit selective disclosure of based on a contextual relation; and the system is configured to preclude inclusion of private-designated keywords of the first and second user within the set of one or more common keywords, and to preclude disclosure of an item of interest to a user if the item is designated private.

In an Example 42: the keyword UIs further include a public designation to permit disclosure without contextual relation constraint; and the keyword module is configured to compare a combined set of public-designated and contextual-designated keywords of the first user to a combined set of public-designated and contextual-designated keywords of the second user to identify the set of one or more common keywords.

In an Example 43, data agents of the first and second users are each configured to selectively disclose contextual-designated keywords of the respective user to other users based on contextual relations with the other users, and to disclose public-designated keywords of the respective user to other users without contextual relation constraint.

An Example 44 is a system to selectively disclose information based on a contextual relation, comprising: a contextual relation module to select a subset of items of interest to a first user based on a contextual relation between the first user and a second user, and to disclose the subset of items within a workspace of the second user as a wish list of items of interest the first user that is tailored based on the contextual relation; a market module to provide a market to receive items from the workspace of the second user and from workspaces of one or more other users, and to select a subset of market items based on the contextual relation between the first and second users; a workspace user interface (UI) to permit the second user to view contents of the workspace and to permit the second user to move items from the workspace to the market; and a contextual market UI to permit the second user to view the subset of market items, submit input regarding the subset of market items, and elect to contribute toward a crowd-based purchase of an item within the subset of market items as a gift to the recipient.

In an Example 45, the contextual relation module is configured to identify shared subjects of interest of the first and second users, identify items of interest to the first user that relate to the shared interests, and include the identified items within the subset of items of interest to the first user.

In an Example 46, the contextual relation module is configured to determine a nature of a social relationship between the first and second users, identify items of interest to the first user based on the nature of the social relationship, and include the identified items within the subset of items of interest to the first user.

In an Example 47, the contextual relation module includes a data module, a keyword module, and a process module as recited in one or more other Examples.

In an Example 48, the contextual market UI is configured to permit the second user to vote on items within the subset of market items.

In an Example 49, the market module is configured to tally votes of multiple users and associate scores to market items based on respective vote tallies, and the contextual market UI is further configured to permit the second user to view scores associated with the subset of market items.

In an Example 50, the market module is further configured to weight a vote of the second user based on contextual information of the second user.

In an Example 51, the market module is configured to weight the vote based on one or more of: a measure of expertise of the second user with respect to a subject matter of the vote; a measure of interest of the second user with respect to the subject matter of the vote; and a social relationship between the first and second users.

In an Example 52, The system of claim 48, wherein the contextual market UI is further configured to permit the second user to view votes of other users directed to the subset of market items, and to view information of the respective other users.

In an Example 53, the contextual market UI is configured to permit the second user to submit comments regarding items within the subset of market items, and to permit the second user to view comments submitted by other users regarding items within the subset of market items and to view information of the respective other users.

In an Example 54, the workspace UI is configured to permit the second user to add an item to the workspace from a source other than the contextual relation contextual relation module.

In an Example 55, the system of Example 44 further includes a score module to assign a score to the added item indicative of a likelihood that the added item is of interest to the first user.

In an Example 56, the score module is configured to assign the score based on one or more of: an extent to which the added item relates to an interest of the first user; an extent to which the added item relates to a shared interest of the first and second users; an extent to which the added item relates to an interest of the second user; a measure of expertise of the second user with respect to a subject matter of the added item; and a social relationship between the first and second users.

In an Example 57, the system of Example 44 is configured to: preclude access to the market and to the workspaces of other users, by the first user prior to an event associated with the market; and permit the first user to access one or more of the market and the workspaces of the users subsequent to the event.

In an Example 58, the system of Example 44 is configured to provide a market for each event of the respective user, and to provide a workspace UI and a contextual market UI for each event for which the respective user is an invitee.

An Example 59 is a non-transitory computer readable medium encoded with a computer program, including instructions to cause a processor to: access and extract information from one or more of a user device, a computer-accessible user account, and electronic purchase records of a user; identify items of interest to the user based on the extracted information; retrieve descriptive information regarding the items; cluster the items based on similarities/dissimilarities amongst the items; assign descriptive keywords to the clusters, wherein the keywords represent subjects of interest to the user; compare keywords of a first user with keywords of a second user to identify a set of one or more common keywords, wherein each keyword represents a subject of interest to the respective user, and wherein each common keyword represents a shared subject of interest of the first and second user; identify a subset of items of interest to the first user based on the set of one or more common keywords; and disclose the subset to the second user as a wish list of items interest to the first user that is tailored based on the shared subjects of interest of the first and second users.

In an Example 60, the computer readable medium of Example 59 further includes instructions to cause the processor to: weight a user keyword based on one or more of a measure of user expertise with respect to the corresponding subject and a degree of user interest in the subject; and include an item of interest to the first user within the subset if it relates to a common keyword and a weight associated with the corresponding keyword of the second user meets a threshold.

In an Example 61, the computer readable medium of Example 59 further includes instructions to cause the processor to access and extract information from one or more of: a computer-readable shopping list; a computer browser; an electronic message account; a computer-accessible financial account; a computer-accessible user account with a vendor; and a computer-accessible user account with a social networking service.

In an Example 62, the computer readable medium of Example 59 further includes instructions to cause the processor to compare the keywords of the first and second users in a domain that is inaccessible to the first and second users.

In an Example 63, the computer readable medium of Example 59 further includes instructions to cause the processor to preclude disclosure of non-matching keywords to the first and second users.

In an Example 64, the computer readable medium of Example 59 further includes instructions to cause the processor to identify the subset items of interest to the first user in a domain that is inaccessible to the first and second users.

In an Example 65, the computer readable medium of Example 59 further includes instructions to cause the processor to: permit each of the first and second users to assign one of multiple privacy designations to each keyword of the respective user; and permit each of the first and second users to assign a privacy designation to an item of a cluster that differs from a privacy designation of the cluster.

In an Example 66, the privacy designations of Example 65 include a private designation to preclude disclosure under any circumstance, and a contextual designation to permit selective disclosure of based on a contextual relation, and wherein the instructions include instructions to cause the processor to: preclude inclusion of private-designated keywords of the first and second user within the set of one or more common keywords; and preclude disclosure of an item of interest to a user if the item is designated private.

In an Example 67, the privacy designations of Example 66 further include a public designation to permit disclosure without contextual relation constraint, and wherein the instructions include instructions to cause the processor to: compare a combined set of public-designated and contextual-designated keywords of the first user to a combined set of public-designated and contextual-designated keywords of the second user to identify the set of one or more common keywords.

In an Example 68, the computer readable medium of Example 67 further includes instructions to cause the processor to: selectively disclose contextual-designated keywords of a user to another user based on contextual relations with the other user; and disclose public-designated keywords of a user to another user without contextual relation constraint.

An Example 69 is a non-transitory computer readable medium encoded with a computer program, including instructions to cause a processor to: select a subset of items of interest to a first user based on a contextual relation between the first user and a second user; disclose the subset of items within a workspace of the second user as a wish list of items of interest the first user that is tailored based on the contextual relation; provide a computer-based market to receive items from the workspace of the second user and from workspaces of one or more other users, and to select a subset of market items based on the contextual relation between the first and second users; provide a workspace user interface (UI) to permit the second user to view contents of the workspace and to permit the second user to move items from the workspace to the market; and provide a contextual market UI to permit the second user to view the subset of market items, submit input regarding the subset of market items, and elect to contribute toward a crowd-based purchase of an item within the subset of market items as a gift to the recipient.

In an Example 70, the computer readable medium of Example 69 further includes instructions to cause the processor to: identify shared subjects of interest of the first and second users; identify items of interest to the first user that relate to the shared interests; and include the identified items within the subset of items of interest to the first user.

In an Example 71, the computer readable medium of Example 69 or Example 70 further includes instructions to cause the processor to: determine a nature of a social relationship between the first and second users; identify items of interest to the first user based on the nature of the social relationship; and include the identified items within the subset of items of interest to the first user.

In an Example 72, the computer readable medium of Example 69 further includes instructions to cause the processor to select and disclose the items of interest to the first user in accordance with any one of claims 59-69.

In an Example 73, the computer readable medium of Example 69 further includes instructions to cause the processor to permit the second user to vote on items within the subset of market items through the contextual market UI.

In an Example 74, the computer readable medium of Example 73 further includes instructions to cause the processor to: tally votes of multiple users and associate scores to market items based on respective vote tallies; and permit the second user to view scores associated with the subset of market items, through the contextual market UI.

In an Example 75, the computer readable medium of Example 74 further includes instructions to cause the processor to weight a vote of the second user based on contextual information of the second user.

In an Example 76, the computer readable medium of Example 74 further includes instructions to cause the processor to weight the vote of the second user based on one or more of: a measure of expertise of the second user with respect to a subject matter of the vote; a measure of interest of the second user with respect to the subject matter of the vote; and a social relationship between the first and second users.

In an Example 77, the computer readable medium of Example 73 further includes instructions to cause the processor to: permit the second user to view votes of other users directed to the subset of market items, and to view information of the respective other users, through the contextual market UI.

In an Example 78, the computer readable medium of Example 69 further includes instructions to cause the processor to: permit the second user to submit comments regarding items within the subset of market items, through the contextual market UI; and permit the second user to view comments submitted by other users regarding items within the subset of market items, and to view information of the respective other users, through the contextual market UI.

In an Example 79, the computer readable medium of Example 69 further includes instructions to cause the processor to: permit the second user to add an item to the workspace from a source other than the contextual relation contextual relation module, through the workspace UI.

In an Example 80, the computer readable medium of Example 79 further includes instructions to cause the processor to assign a score to the added item indicative of a likelihood that the added item is of interest to the first user.

In an Example 81, the computer readable medium of Example 80 further includes instructions to cause the processor to assign the score based on one or more of: an extent to which the added item relates to an interest of the first user; an extent to which the added item relates to a shared interest of the first and second users; an extent to which the added item relates to an interest of the second user; a measure of expertise of the second user with respect to a subject matter of the added item; and a social relationship between the first and second users.

In an Example 82, the computer readable medium of Example 69 further includes instructions to cause the processor to: preclude access to the market and to the workspaces of other users, by the first user prior to an event associated with the market; and permit the first user to access one or more of the market and the workspaces of the users subsequent to the event.

In an Example 83, the computer readable medium of Example 69 further includes instructions to cause the processor to: provide a market for each event of the respective user; and provide a workspace UI and a contextual market UI for each event for which the respective user is an invitee.

An Example 84 is a device to permit a user to interface with a crowd-source gift application in which items of interest to a first user are selectively disclosed within workspaces of other users based on contextual relations between the first user and each of the other users, and in which a computer-based market is provided to permit the other users to collaborate with one another based on the respective contextual relations to crowd-source a set of one or more items of interest to a first user, wherein the device comprises a processor, memory, and a display, and wherein the processor and memory are configured to: present a workspace user interface (UI) on the display to permit a second user to view contents of a workspace of the second user, and to permit the second user to move items from the workspace to the market; and present a contextual market UI on the display to permit the second user to view a subset of market items based on a contextual relation between the first and second users, submit input regarding the subset of market items, and elect to contribute toward a crowd-based purchase of an item within the subset of market items as a gift to the recipient.

In an Example 85, the crowd-source gift application of Example 84 includes a data module and a keyword module as recited in any one of Examples 34-43, and the processor and memory are configured to present a keyword UI as recited in any one of Examples 40-42 and/or to disclose keywords of the second user as recited in Example 43.

In an Example 86, the crowd-source gift application includes a contextual relation module and a market module, and wherein the contextual relation module, the market module, the workspace UI, and the contextual market UI are configured as recited in any one of Examples 44-58.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed. While various embodiments are disclosed herein, it should be understood that they are presented as examples. The scope of the claims should not be limited by any of the example embodiments disclosed herein.

What is claimed is:

1. A machine implemented method for managing crowd-sourced gifting by invitees of an event to a potential gift recipient associated with the event, comprising:

selecting, by a computing server, a subset of items of interest to the potential gift recipient based on a contextual relation between the potential gift recipient and a first of the invitees of the event;

disclosing, by the computing server, the subset of items within a workspace on a first client computing device of the first invitee of the event as a wish list of items of interest to the potential gift recipient that is tailored based on the contextual relation;

providing, by the computing server, a computer-based market on the computing server to receive items from the workspace on the first client computing device of the first invitee of the event and from workspaces on one or more other client computing devices of one or more other ones of the invitees of the event, and to select a subset of items in the market based on the contextual relation between the potential gift recipient and the first invitee of the event;

providing, by the computing server, a workspace user interface (UI) on the client computing device of the first invitee of the event to permit the first invitee of the event to view contents of the workspace and to permit the first invitee of the event to move items from the workspace on the first client computing device to the market on the computing server; and providing, by the computing server, a contextual market UI on the client computing device of the first invitee of the event to permit the first invitee of the event to view the subset of items in the market, submit input regarding the subset of items in the market, and elect to contribute toward a crowd-based purchase of an item within the subset of items in the market as a gift to the potential gift recipient.

2. The method of claim 1, wherein the selecting includes:
identifying shared subjects of interest of the potential gift recipient and the first invitee of the event;
identifying items of interest to the potential gift recipient that relate to the shared interests; and
including the identified items within the subset of items of interest to the potential gift recipient.

3. The method of claim 1, wherein the selecting includes:
determining a nature of a social relationship between the potential gift recipient and the first invitee of the event;
identifying items of interest to the potential gift recipient based on the nature of the social relationship; and
including the identified items within the subset of items of interest to the potential gift recipient.

4. The method of claim 1, further including:
accessing and extracting, by the computing server, information from electronic purchase records of the potential gift recipient and the first invitee of the event;
identifying, by the computing server, items of interest to the potential gift recipient and to the first invitee of the event, based on the extracted information;
retrieving, by the computing server, descriptive information regarding the items;
clustering, by the computing server, the items based on similarities/dissimilarities amongst the items;
assigning, by the computing server, descriptive keywords to the clusters;
comparing, by the computing server, keywords of the potential gift recipient with keywords of the first invitee of the event to identify a set of one or more common keywords, wherein each keyword represents a subject of interest to the respective potential gift recipient and the first invitee of the event, and wherein each common keyword represents a shared subject of interest of the potential gift recipient and the first invitee of the event;
identifying, by the computing server, a subset of items of interest to the potential gift recipient based on the set of one or more common keywords; and
disclosing, by the computing server, the subset of items of interest identified to the first invitee of the event as a wish list of items of interest to the potential gift recipient that is tailored based on the shared subjects of interest of the potential gift recipient and the first invitee of the event.

5. The method of claim 4, further including:
weighting, by the computing server, a keyword based on one or more of a measure of expertise or a degree of interest of the potential gift recipient or the first invitee of the event; and
including, by the computing server, an item of interest to the potential gift recipient within the subset if it relates to a common keyword and a weight associated with the corresponding keyword of the first invitee of the event meets a threshold.

6. The method of claim 4, further including:
permitting, by the computing server, each of the potential gift recipient and the first invitee of the event to assign one of multiple privacy designations to each keyword of the respective potential gift recipient and the first invitee of the event, wherein the privacy designations include a private designation to preclude disclosure under any circumstance, or a contextual designation to permit selective disclosure based on the contextual relation;
precluding, by the computing server, inclusion of private-designated keywords of the potential gift recipient and the first invitee of the event within the set of one or more common keywords; and
precluding, by the computing server, disclosure of an item of interest to the potential gift recipient or the first invitee of the event if the item is designated private.

7. The method of claim 4, further including:
permitting, by the computing server, the first invitee of the event to vote on items within the subset of items in the market, through the contextual market UI;
tallying, by the computing server, votes of multiple invitees of the event, and associate scores to the subset of items in the market based on respective vote tallies; and
permitting, by the computing sever, the first invitee of the event to view scores associated with the subset of items in the market, through the contextual market UI.

8. The method of claim 7, further including weighting, by the computing server, a vote of the first invitee of the event based on one or more of:
a measure of expertise of the first invitee of the event;
a measure of interest of the first invitee of the event; or
a social relationship between the potential gift recipient and the first invitee of the event.

9. The method of claim 1, further including:
permitting, by the computing server, the first invitee of the event to submit comments regarding items within the subset of items in the market, through the contextual market UI; and
permitting, by the computing server, the first invitee of the event to view comments submitted by other invitees of the event regarding items within the subset of items in the market, and to view information of the respective other invitees of the event, through the contextual market UI.

10. The method of claim 1, further including permitting, by the computing server, the first invitee of the event to add an item to the workspace from another source, through the workspace UI, and assigning a score to the added item based on one or more of:
  an extent to which the added item relates to an interest of the potential gift recipient;
  an extent to which the added item relates to a shared interest of the potential gift recipient and the first invitee of the event;
  an extent to which the added item relates to an interest of the first invitee of the event;
  a measure of expertise of the first invitee of the event; or
  a social relationship between the potential gift recipient and the first invitee of the event.

11. A computing server apparatus for managing crowd-sourced gifting by invitees of an event to a potential gift recipient associated with the event, comprising a processor and memory configured to:
  select a subset of items of interest to the potential gift recipient based on a contextual relation between the potential gift recipient and a first of the invitees of the event;
  disclose the subset of items within a workspace of a first client computing device of the first invitee of the event as a wish list of items of interest to the potential gift recipient that is tailored based on the contextual relation;
  provide, on the computing server apparatus, a computer-based market to receive items from the workspace on the first client computing device of the first invitee of the event and from workspaces on one or more other client computing devices of one or more other ones of the invitees of the event, and to select a subset of items in the market based on the contextual relation between the potential gift recipient and the first invitee of the event;
  provide a workspace user interface (UI) on the first client computing device to permit the first invitee of the event to view contents of the workspace and to permit the first invitee of the event to move items from the workspace on the first client computing device to the market on the computing server apparatus; and
  provide a contextual market UI on the first client computing device to permit the first invitee of the event to view the subset of items in the market, submit input regarding the subset of items in the market, and elect to contribute toward a crowd-based purchase of an item within the subset of items in the market as a gift to the potential gift recipient.

12. The apparatus of claim 11, wherein the processor and memory are further configured to:
  identify shared subjects of interest of the potential gift recipient and the first invitee of the event;
  identify items of interest to the potential gift recipient that relate to the shared interests; and
  include the identified items within the subset of items of interest to the first potential gift recipient.

13. The apparatus of claim 11, wherein the processor and memory are further configured to:
  determine a nature of a social relationship between the potential gift recipient and the first invitee of the event;
  identify items of interest to the potential gift recipient based on the nature of the social relationship; and
  include the identified items within the subset of items of interest to the potential gift recipient.

14. The apparatus of claim 11, wherein the processor and memory are further configured to:
  access and extract information from electronic purchase records of the potential gift recipient and the first invitee of the event;
  identify items of interest to the potential gift recipient and the first invitee of the event based on the extracted information;
  retrieve descriptive information regarding the items;
  cluster the items based on similarities/dissimilarities amongst the items;
  assign descriptive keywords to the clusters; compare keywords of the potential gift recipient with keywords of the first invitee of the event to identify a set of one or more common keywords, wherein each keyword represents a subject of interest to the respective user, and wherein each common keyword represents a shared subject of interest of the potential gift recipient and the first invitee of the event;
  identify a subset of items of interest to the potential gift recipient based on the set of one or more common keywords; and
  disclose the subset to the first invitee of the event as a wish list of items of interest to the potential gift recipient that is tailored based on the shared subjects of interest of the potential gift recipient and the first invitee of the event.

15. The apparatus of claim 11, wherein the processor and memory are further configured to permit the first invitee of the event to add an item to the workspace from an external source, through the workspace UI, and assign a score to the added item based on one or more of:
  an extent to which the added item relates to an interest of the potential gift recipient;
  an extent to which the added item relates to a shared interest of the potential gift recipient and the first invitee of the event;
  an extent to which the added item relates to an interest of the first invitee of the event;
  a measure of expertise of the first invitee of the event; or
  a social relationship between the potential gift recipient and the first invitee of the event.

16. A non-transitory computer readable medium encoded with a computer program that includes instructions to cause a computing server, in response to execution of the instructions by the computing server, to:
  select a subset of items of interest to a potential gift recipient associated with an event based on a contextual relation between the potential gift recipient and a first of a plurality of invitees of the event;
  disclose the subset of items within a workspace of a first client computing device of the first invitee of the event as a wish list of items of interest to the potential gift recipient that is tailored based on the contextual relation;
  provide a computer-based market on the computing server to receive items from the workspace on the first client computing device of the first invitee of the event and from workspaces of one or more other client computing devices of one or more other invitees of the event, and to select a subset of items in the market based on the contextual relation between the potential gift recipient and the first invitee of the event;
  provide a workspace user interface (UI) on the first client computing device to permit the first invitee of the event to view contents of the workspace and to permit the first invitee of the event to move items from the workspace on the first client computing device to the market on the computing server; and provide a contextual market UI on the first client computing device to permit the first invitee of the event to view the subset of items in the market, submit input regarding the subset of items in the market, and elect to contribute toward a crowd-based purchase of an item within the subset of items in the market as a gift to the potential gift recipient.

17. The non-transitory computer readable medium of claim 16, further including instructions to cause the computing server to:

identify shared subjects of interest of the potential gift recipient and the first invitee of the event;

identify items of interest to the potential gift recipient that relate to the shared interests; and include the identified items within the subset of items of interest to the potential gift recipient.

18. The non-transitory computer readable medium of claim 16, further including instructions to cause the computing server to:

determine a nature of a social relationship between the potential gift recipient and the first invitee of the event;

identify items of interest to the potential gift recipient based on the nature of the social relationship; and include the identified items within the subset of items of interest to the potential gift recipient.

19. The non-transitory computer readable medium of claim 16, further including instructions to cause the computing server to:

access and extract information from electronic purchase records of the potential gift recipient and the first invitee of the event;

identify items of interest to the potential gift recipient and the first invitee of the event based on the extracted information;

retrieve descriptive information regarding the items;

cluster the items based on similarities/dissimilarities amongst the items;

assign descriptive keywords to the clusters, wherein the keywords represent subjects of interest to the potential gift recipient or the first invitee of the event;

compare keywords of a potential gift recipient with keywords of a first invitee of the event to identify a set of one or more common keywords, wherein each keyword represents a subject of interest to the respective potential gift recipient and the first invitee of the event, and wherein each common keyword represents a shared subject of interest of the potential gift recipient and the first invitee of the event;

identify a subset of items of interest to the potential gift recipient based on the set of one or more common keywords; and disclose the subset to the first invitee of the event as a wish list of items of interest to the potential gift recipient that is tailored based on the shared subjects of interest of the potential gift recipient and the first invitee of the event.

20. The non-transitory computer readable medium of claim 16, further including instructions to cause the computing server to permit the first invitee of the event to add an item to the workspace on the first client computing device from an external source, through the workspace UI on the first client computing device, and assign a score to the added item based on one or more of:

an extent to which the added item relates to an interest of the potential gift recipient;

an extent to which the added item relates to a shared interest of the potential gift recipient and the first invitee of the event;

an extent to which the added item relates to an interest of the first invitee of the event;

a measure of expertise of the first invitee of the event with respect to a subject matter of the added item; and a social relationship between the potential gift recipient and the first invitee of the event.

* * * * *